(12) United States Patent
Sandhu et al.

(10) Patent No.: US 11,411,839 B1
(45) Date of Patent: Aug. 9, 2022

(54) SYSTEM AND METHOD TO CORRELATE END USER EXPERIENCE WITH LOCATION

(71) Applicant: Citrix Systems, Inc., Fort Lauderdale, FL (US)

(72) Inventors: Vikramjeet Singh Sandhu, Bangalore (IN); Vivek Koni Raghuveer, Bangalore (IN); Guna Sekhar Pera, Bangalore (IN); Neha Joshi, Bangalore (IN); Mukesh Garg, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/172,454

(22) Filed: Feb. 10, 2021

(51) Int. Cl.
*H04L 41/5009* (2022.01)
*H04L 67/50* (2022.01)
*H04L 41/5061* (2022.01)
*H04W 4/02* (2018.01)
*H04L 43/16* (2022.01)

(52) U.S. Cl.
CPC ...... *H04L 41/5016* (2013.01); *H04L 41/5064* (2013.01); *H04L 43/16* (2013.01); *H04L 67/22* (2013.01); *H04W 4/02* (2013.01)

(58) Field of Classification Search
CPC ..... H04L 41/00; H04L 41/50; H04L 41/5003; H04L 41/5009; H04L 41/5012; H04L 41/5016; H04L 41/5061; H04L 41/5064; H04L 41/5067; H04L 43/00; H04L 43/06; H04L 43/08–0894; H04L 43/16; H04L 67/00; H04L 67/22; H04W 4/00; H04W 4/02
See application file for complete search history.

(56) References Cited

U.S. PATENT DOCUMENTS

| 10,601,684 B2 * | 3/2020 | Hashmi | G06T 17/05 |
| 10,904,311 B1 * | 1/2021 | Surazski | H04L 65/1066 |
| 2009/0300688 A1 * | 12/2009 | Karaoguz | H04N 21/6131 725/62 |
| 2012/0136697 A1 * | 5/2012 | Peles | G06Q 10/0639 705/7.38 |

(Continued)

OTHER PUBLICATIONS

"How do I determine the physical location of an IP address", Computer Hope (Year: 2020).*

*Primary Examiner* — Austin J Moreau
(74) *Attorney, Agent, or Firm* — Foley & Lardner LLP

(57) ABSTRACT

Described embodiments provide for associating a user experience score with a location of a client. A device may identify a session between the client and an application service established via a first network. The device may receive, via the application service, a network address of the client associated with a second network. The device may determine a location of the client accessing the application service via the first network based at least on the network address associated with the second network. The device may receive, from an instrumentation service, performance factors for the client. Each of the performance factors may be associated with access to the application service by the client. The device may generate a user experience score for the client based at least on the performance factors. The device may provide an instruction based at least on an association between the user experience score and the location.

18 Claims, 14 Drawing Sheets

(56) References Cited

U.S. PATENT DOCUMENTS

| | | | |
|---|---|---|---|
| 2013/0018632 A1* | 1/2013 | Field | H04L 67/025 |
| | | | 702/183 |
| 2015/0327007 A1* | 11/2015 | Li | H04L 61/6022 |
| | | | 455/456.1 |
| 2017/0052870 A1* | 2/2017 | Shuvali | G06F 11/3419 |
| 2017/0111813 A1* | 4/2017 | Town | H04L 43/16 |
| 2019/0313267 A1* | 10/2019 | Joul | H04W 4/02 |
| 2020/0272763 A1* | 8/2020 | Brannon | H04L 67/02 |

* cited by examiner

SYSTEM AND METHOD TO CORRELATE END USER EXPERIENCE WITH LOCATION

FIELD OF THE DISCLOSURE

The present application generally relates to evaluating network performance. In particular, the present application relates to systems and methods for associating a user experience score with a location of a client.

BACKGROUND

A client may access an application service via a network. A user of the client may experience varying level of experience depending on the network.

BRIEF SUMMARY

Users may login from different locations to access an application service hosted in a remote environment. The location of the end users can affect their user experience, which can be determined from logon duration, Independent Computing Architecture (ICA), round trip time values, or connection reconnects and failures. Based on the location and user experience, network administrators can evaluate a network that a set of end users from a common location are using, and configure network settings for an associated remote environment. Under certain approaches, network administrators can monitor network performance by analyzing a delivery group as defined by the application service for the end user or the location of the end user in an active directory (AD) to determine whether network performance is for the end users.

However, location and delivery groups might not have a one-to-one mapping. For instance, some enterprises create delivery group by function such as HR or Engineering. Determining a location of the user may include manual efforts or fallback to AD location, which may not be accurate or incomplete. Moreover, the location that is defined in the AD may be a home office location associated with the user rather than an actual location of the user. As such, obtaining the location of the end user and correlating a user experience of the user with their location can be difficult. Lacking such information, a network administrator may face significant difficulty or may be unable to manage network configurations and perform fault analysis of the network. Without the ability to manage network configuration or perform fault analysis, network issues (e.g., network delay, packet loss, and service outages) between the end users and application services may persist. The persistence of such network issues may also result in poor quality of service (QoS) and user experience among end-users of the network and application services. This not only may decrease performance of the overall system but also may lead to lower the quality of the human-computer interaction (HCI) between the end user and the service.

To account for these and other challenges, a correlation between user experience and location may be determined by estimating user location based on session information. If the location is unavailable to be directly determined from the session information (e.g., a public Internet Protocol (IP) address of the client), a best effort estimate can be performed to obtain the location. The obtained end user locations can then be associated with user experience. The correlation may be used to identify locations in which end users are determined to be experiencing unsatisfactory user experiences. Furthermore, the association between location and user experience score may be used to perform additional analysis to pinpoint a cause for the low user experience, such as the network-related factors, user-specific issues, or other configuration-related problems. In this manner, network administrators may be provided with a heuristic location based analytics system based on a holistic approach of correlating location and user experience. Using the correlation between location and user experience, which countermeasures to address the network issues may be determined, and carried out in an automated or semi-automated fashion.

The locations of endpoint devices can be collected. Determining a location of an endpoint user and associating it with user experience can include a workspace application, such as a workspace application, sending a public IP of a user device from which an end user launches a network session. The user device can be known as an endpoint device. The public IP can then be processed to obtain a location mapping of the public IP. The location information from the workspace application can be combined with the session launch data that is obtained from a monitor. The performance information from the monitor can include logon duration, Independent Computing Architecture (ICA), round trip time values, or connection reconnects and failures. The performance information may be used to calculate a user experience score, and the location information from the workspace app to can provide analytics based on the location.

The workspace application can be instructed to make a call during a session launch. The call is made to a CAS endpoint, which obtains a public IP associated with the endpoint device during session launch and returns the public IP of the endpoint device from where the session is launched. The workspace application obtains the public IP of the endpoint device that is being used and caches the public IP until it detects a network change wherein this IP is re-fetched. By caching the public IP, additional overhead during session launch can be avoided. The public IP information can be sent to a CAS Event Hub along with any other session launch information, such as a session Key. Workspace application can also be configured to not fetch and send the public IP or endpoint, such as due to enterprise restrictions. An extract, transform, load (ETL) layer can copy the payloads from an event monitor system, such as a data streaming platform and event ingestion service (e.g., CAS Event Hub). A mapping of the public IP to a geographic location may be performed using a geolocation database (e.g., MaxMind DB), which can be outputted to a streaming framework for storing, reading and analyzing streaming data (e.g., receiver Kafka topic). Any corresponding session information can be obtained or stored in records (e.g., Xmonitor Kafka topic) of a monitoring service. However, public IP information, session launch information, or any other network events can be out of sync. For instance, the system can identify if the location information is obtained prior to the monitoring data.

A best effort estimation of the location can also be utilized. For instance, if a location of an endpoint device is not obtained directly, a best effort estimation can provide an estimate of the location. The best effort estimation can include attempting to obtain the location as previously discussed herein, and if a non-null value of a location, such as country or city, is obtained, then those values can be stored and used for a particular session. If a user launches multiple sessions and location data is not available for all sessions, then the location information of the last non-null value for any session can be used. For instance, a user might not launch multiple sessions from different locations and may use one device in one location. Therefore, previous location information can be used in situations involving non-supported versions of workspace applications or unresolved IP addresses. However, if a user launches a new session and that session does not have location information, then a fallback can be the last non-null location value for that user. Similarly, if a user does not have any location information, then a fallback can be the public IP obtained from a gateway or application service associated with the new session. Location attributes of components like the gateway can also be correlated with user experience, and analyzed if particular user experiences are related to particular location attributes. The fallback can also be to a storefront service, which provides a public IP of the user. Accordingly, the location information is robust and provided as a best estimate if location information is not directly available such as due to unsupported versions of workspace applications, the client device (e.g., CAS endpoint) from which to obtain the public IP is not whitelisted, or a mapping of the IP to location is missing.

A streaming platform (e.g., Spark App) can read from the streaming framework (e.g., Kafka topics), and a user experience is calculated from the metrics obtained through the monitoring service and the corresponding location is obtained from the workspace application. The calculated user experience or the obtained location can be stored in a state table for output to a distributed data store (e.g., Apache Druid) for display to network administrators. The calculated user experience or the obtained location can be stored in the state table because launch is a one-time event but calculated user experience or the obtained location can be used during the lifetime of a session.

The associations between user experience score and location can be analyzed and correlated. Dynamic functionality can determine network degradations for an end user unique to any particular location while detecting for changes in location. Statistical information correlating end user locations with user experience can be provided in a graphical user interface, and common locations of end users that have unsatisfactory user experience can then be identified or highlighted. Statistical information regarding the correlation location with user experience may be provided to highlight the common locations of users having a poor user experience.

The determined location information can be provided to a network administrator to view the experience of the user at various locations or to view user experience at selected locations. A heat-map of geographical locations along with associated user experience can also be displayed. The heat-map can be known as a geo-map and can be color coded based on user experience and location. For instance, red colors on the map can indicate a poor user experience in that area, yellow can indicate a medium user experience, and blue or green can indicate an excellent user experience.

Detections of degradations to user experience can be associated with a location. If the user experiences are mapped by network performance, degradations to the user experience can be mapped on a location basis and every location can have a characteristic performance metric. Moreover, changes in location can be detected and associated with any identifications of degradations to user experience. In addition to monitoring for degradations specific to a location, if degradations are observed for a user, then a change in location can be detected to determine a cause for the performance degradation.

With these determinations, end user experience may be correlated with location. A network of enterprises can be monitored to collect data for generating a robust correlation between location and user experience for location based analytics. Obtaining or determining location based analytics or performance analytics can include obtaining the endpoint location and correlation with the end user, or best effort estimating of the endpoint location and analysis based on the endpoint location. The endpoint location for virtual applications and desktops sessions can be obtained or location based analytics can be determined.

By having a holistic location based analytics, network administrators can determine user experiences in any system and correlate the user experiences with locations. The experience metrics of users consuming virtual apps and desktops sessions can be associated with approximate locations of the users. A location of an endpoint device can be determined by analyzing the public network IP from a workspace application or Gateway, or by retrieving, from a directory, a city and country associated with the public network IP. The location can also be correlated to calculated metrics of user sessions by utilizing a cloud-based data collection and processing platform to implement a correlation involving user and session state. Accordingly, the adoption of cloud-based services can be promoted by enriching user or device security insights with approximate location and implement geo-fencing capabilities.

At least one aspect of this disclosure is directed to systems, methods, and non-transitory computer readable media for associating a user experience score with a location of a client. A device may identify a session between a client and an application service established via a first network. Responsive to identifying the session, the device may obtain, via the application service, a network address of the client associated with a second network. The device may determine a location of the client accessing the application service via the first network based at least on the network address associated with the second network. The device may receive, from an instrumentation service, a plurality of performance factors for the client. Each of the plurality of performance factors may be associated with access to the application service by the client. The device may generate a user experience score for the client based at least on the plurality of performance factors. The device may provide an instruction based at least on an association between the user experience score for the client with the location.

In some embodiments, the device may determine a cause of the user experience score determined to be less than a threshold score based at least on the location of the client. In some embodiments, the device may determine, responsive to the user experience score less than a threshold score, the instruction to provide for a mitigation action to be performed to the session between the client and the application service. The mitigation action may include at least one of a redirection of the client to a second application service, a reconfiguration of the application service, or a rerouting of the client through a third network.

In some embodiments, the device may identify a second association between the client and one or more second clients accessing the application service based at least on a second location for each of the one or more second clients. In some embodiments, the device may provide a graphical user interface for presentation of an indicator identifying the association between the user experience score for the client with the location.

In some embodiments, the device may detect, via the application service, a change in the network address of the client within the second network. The device may update, responsive to detecting the change, the location and the association between the location and the user experience score for the client.

In some embodiments, the device may detect a change to the user experience score for the client based at least on a second plurality of performance factors identified subsequent to the plurality of performance factors. The device may update the association between the location and the user experience score in accordance with the change to the user experience score.

In some embodiments, the device may identify, responsive to failure to identify the location from at least one of the session or the network address, a second location of the client from a prior session with the application service. In some embodiments, the device may identify, responsive to failure to identify the location from at least one of the session or the network address, a second location of a proxy as the location of the client. In some embodiments, the first network is a private network and the second network is a public network for communications. The network address may be a public network address in the public network.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
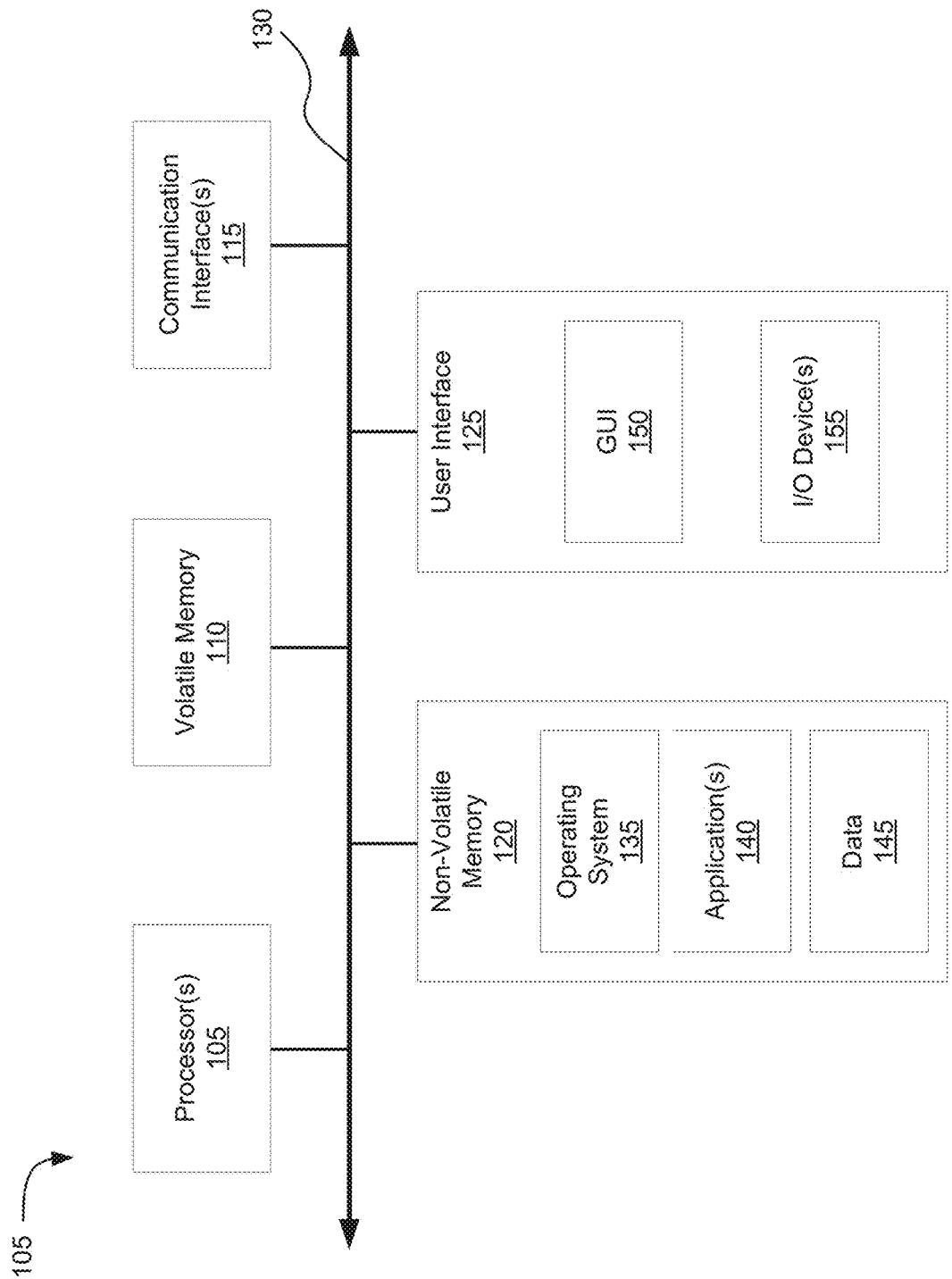
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods for associating a user experience score with a location of a client.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 130 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 135, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 130 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 135 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
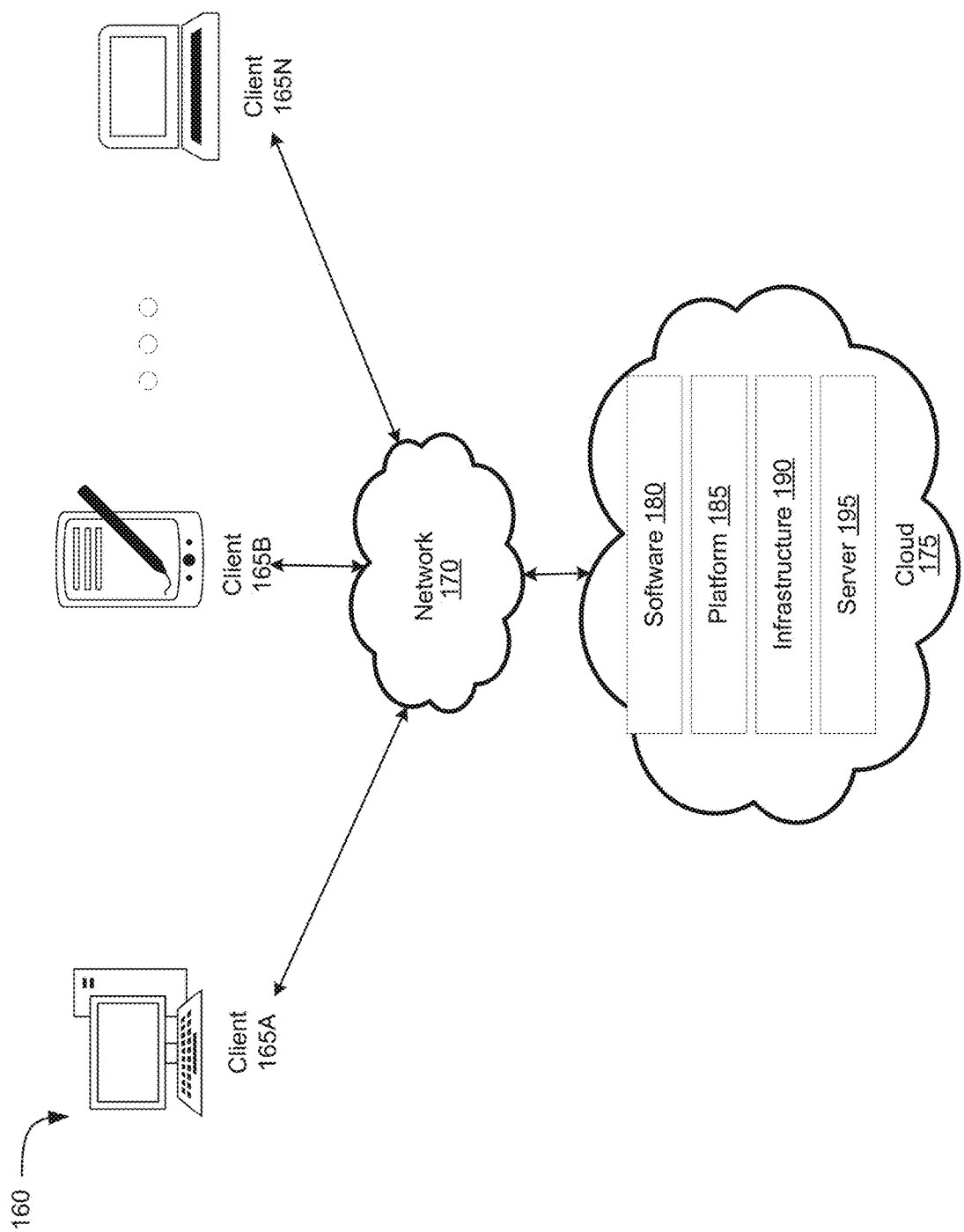
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170. Clients 165 may include, e.g., thick clients, thin clients, and zero clients. The cloud 108 may include back end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
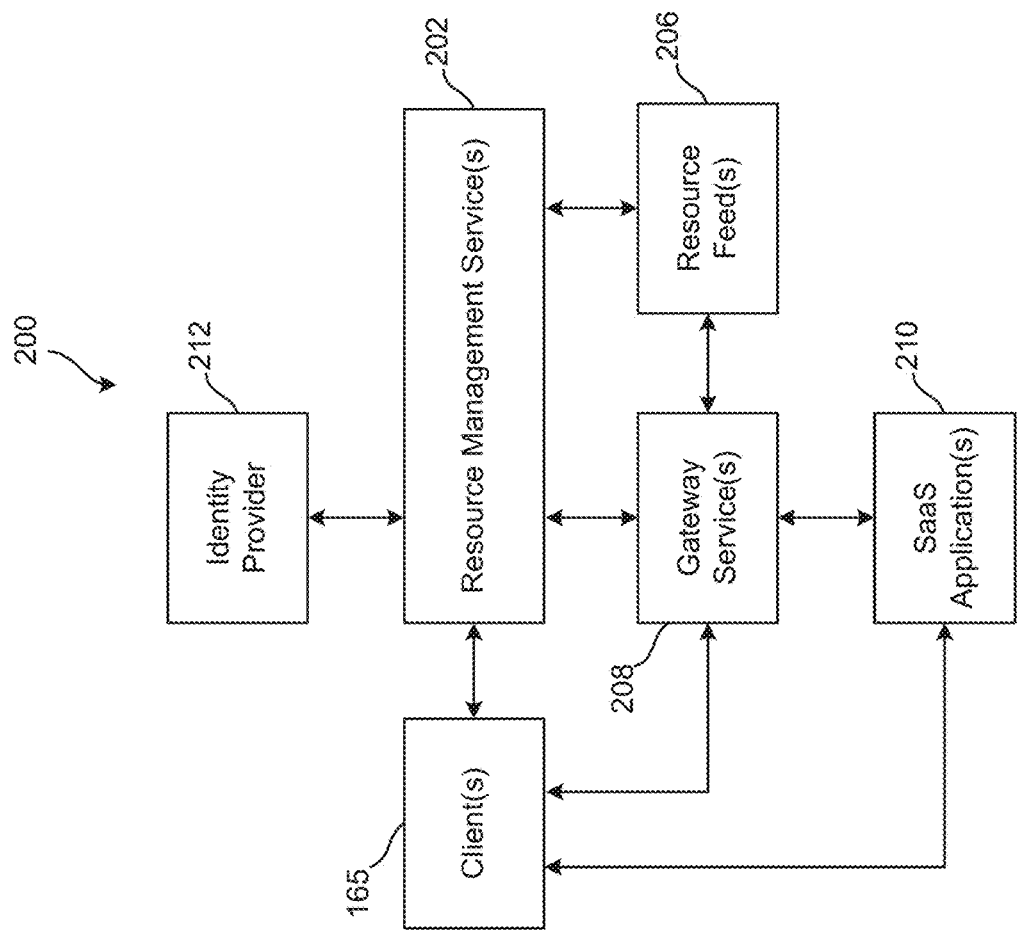
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 165 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one or more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 202, one or more file repositories and/or file sharing systems, one or more secure browser services, one or more access control services for the SaaS applications 210, one or more management services for local applications on the client(s) 202, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
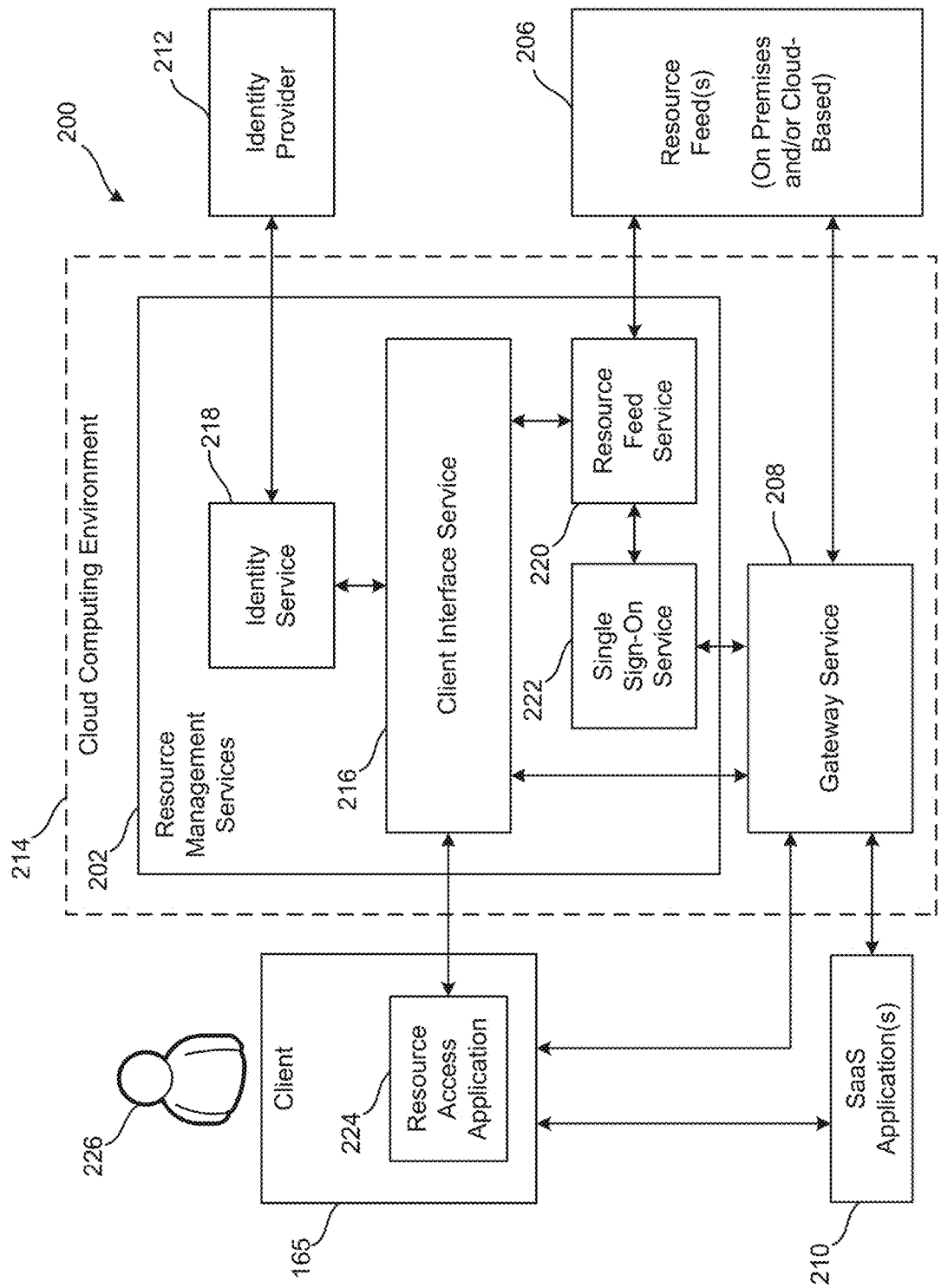
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud computing environment may, for example, include Microsoft Azure Cloud, Amazon Web Services, Google Cloud, or IBM Cloud.

For any of illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 226 of something that requires the user's attention (e.g., approval of an expense report, new course available for registration, etc.).

Figure 2C:
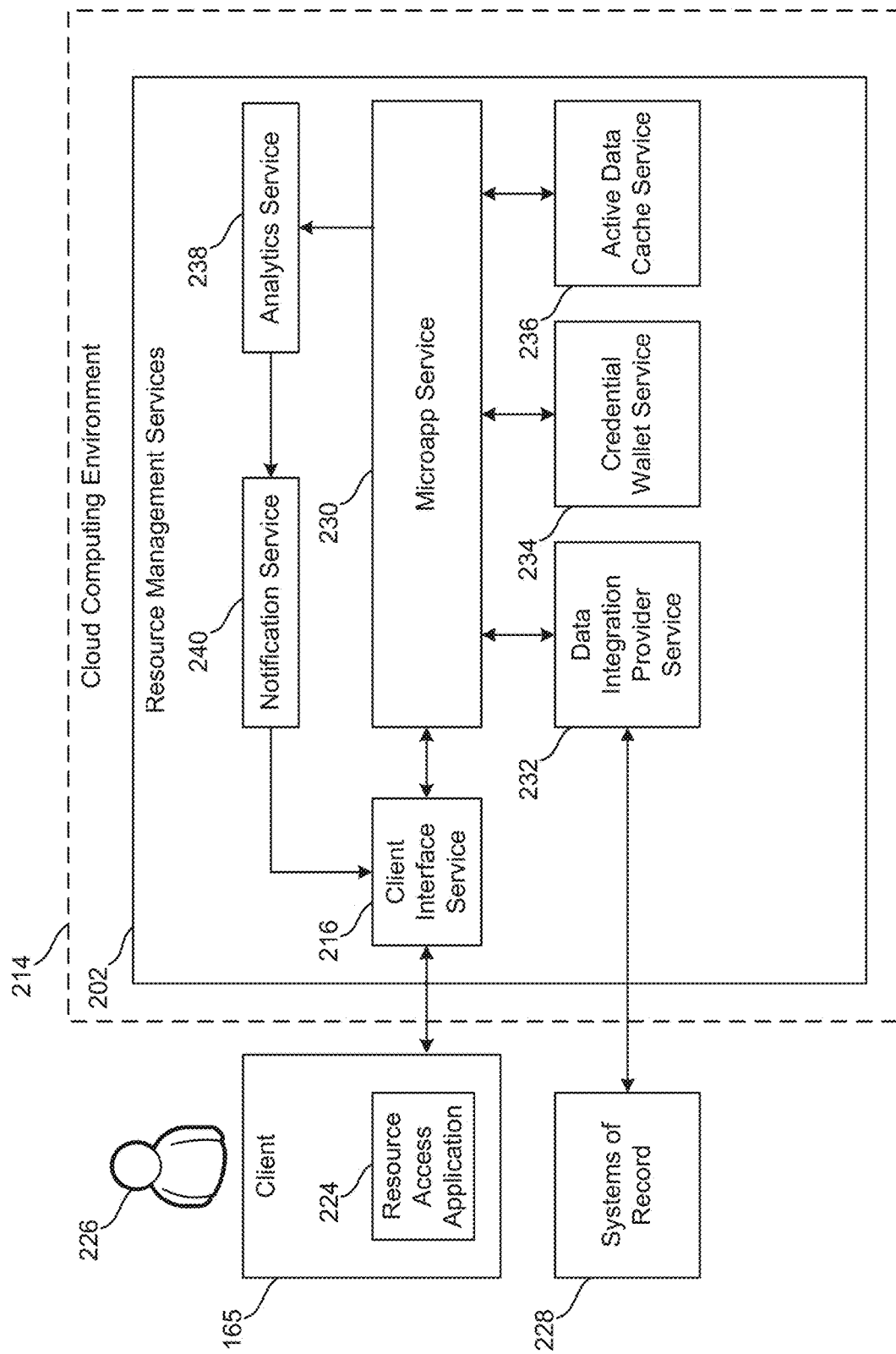
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted Oauth2 token for the system of record for which the action is to be invoked, and may send the action to the data integration provider service 232 together with the encrypted Oath2 token. The data integration provider service 232 may then decrypt the Oath2 token and write the action to the appropriate system of record under the identity of the user 226. The data integration provider service 232 may then read back changed data from the written-to system of record and send that changed data to the microapp service 230. The microapp service 232 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back-end. In some embodiments, users may be able to interact with the virtual assistance through either the resource access application 224 or directly from another resource, such as Microsoft Teams. This feature may allow employees to work efficiently, stay organized, and deliver only the specific information they are looking for.

Figure 3A:
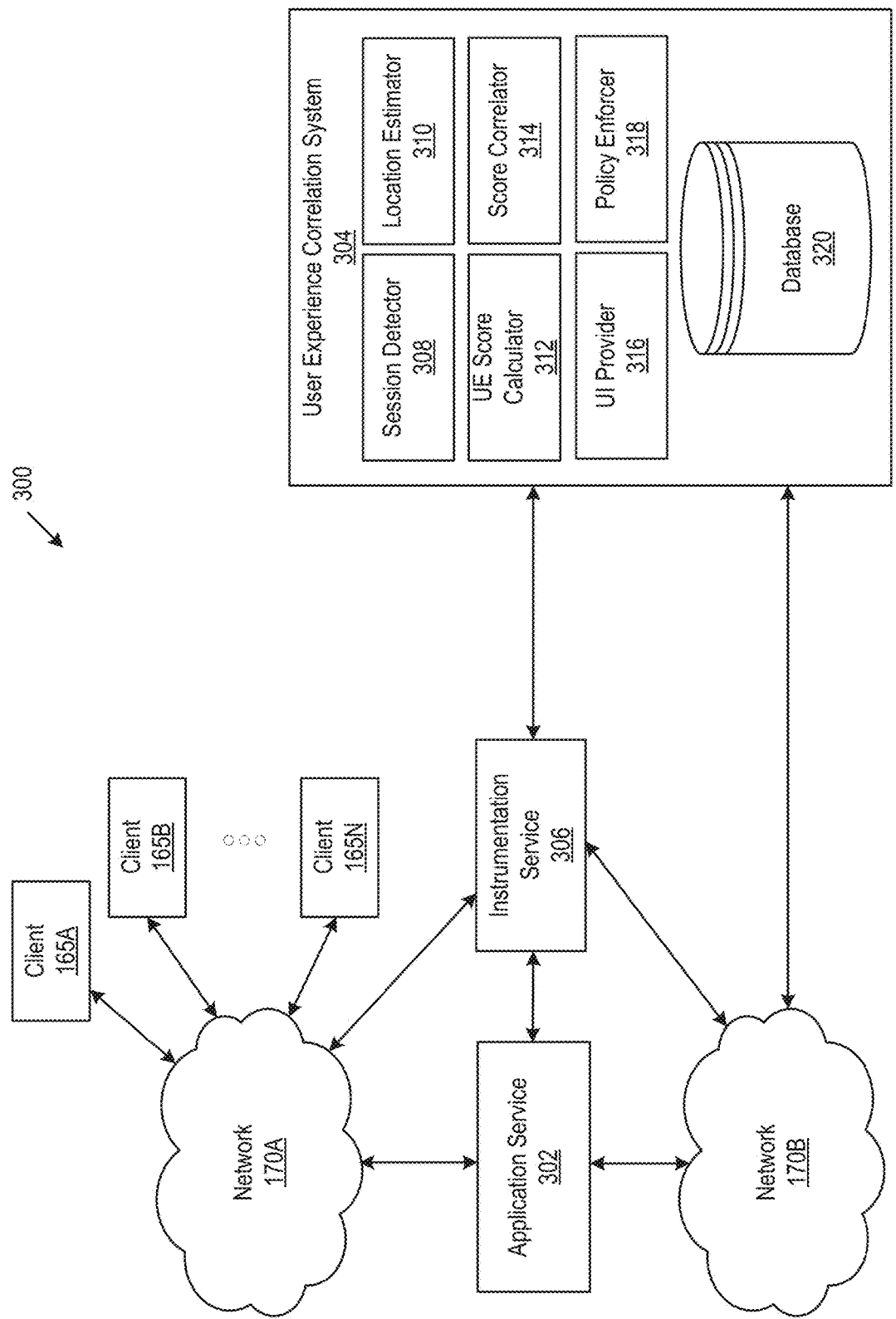
FIG. 3A is a block diagram of a system for associating a user experience score with a location of a client in accordance with an illustrative embodiment.

C. Systems and Methods for Associating a User Experience Score with a Location of a Client Referring now to FIG. 3A, depicted is a block diagram of a system 300 for correlating end user experience with location. In brief overview, the system 300 may include one or more clients 165A-165N (hereinafter generally referred to as client 165), one or more networks 170A and 170B (hereinafter generally referred to as network 170), at least one application service 302, a user experience correlation system 304 and at least one instrumentation service 306 system 304. The client 165 can be communicatively coupled to the instrumentation service 306 and the application service 302 via the network 170A. The application service 302 can be communicatively coupled to the user experience correlation system 304 via the network 170B. The instrumentation service 306 may also be communicatively coupled to the user experience correlation system 304. The user experience correlation system 304 may include at least one session detector 308, a location estimator 310, a user experience (UE) score calculator 312, a score correlator 314, a UI provider 316, a policy enforcer 318, and a database 320.

The application service 302, the instrumentation service 306, and the user experience correlation system 304 (including the session detector 308, the location estimator 310, the UE score calculator 312, the score correlator 314, the UI provider 316, the policy enforcer 318, and the database 320) the may be implemented using components described in connection with FIGS. 2A-C. In some embodiments, the application service 302 may include, correspond to, or be the resource feed 206 or a SaaS service 210, or any combination thereof, among others. In some embodiments, the user experience correlation system 304 may include, correspond to, or be a resource management service 202, the gateway service 208, or the identity provider 212, or any combination thereof, among others.

Each of the above-mentioned elements or entities is implemented in hardware, or a combination of hardware and software, in one or more embodiments. Each component of the system 300 may be implemented using hardware or a combination of hardware or software detailed above in connection with FIGS. 1 and 2. Each of these elements or entities can include any application, program, library, script, task, service, process or any type and form of executable instructions executing on hardware of the session detector 308, the location estimator 310, the UE score calculator 312, the score correlator 314, the UI provider 316, the policy enforcer 318, and the database 320. The hardware includes circuitry such as one or more processors in one or more embodiments.

The network 170A can be a network (e.g., a public network or an enterprise network) between the application service 302 and the client 165. The network 170A can include proxies, gateways, and other network nodes to facilitate communications between the client 165 and the application service 302. The network 170A can be a computer that connects the client 165 to the application service 302 over a wide area network (WAN) such as the Internet. The network 170A can intercept, manage, or monitor communications or the sessions 322 established between the client 165 in the application service 302 as they exchange data. The client 165 may use the network 170A to communicate with the application service 302. An application running on the client 165 can access resources hosted on the application service 302 via the session 322. The application service 302 may provide, transmit, or generate services or resources to the client 165 via the network 170A. The application service 302 can provide computer-based services or resources relating to cloud computing, data processing, special purpose software systems, or any other software deployment for at least one client 165.

In contrast, the network 170B can be a separate network (e.g., a private network or an Intranet network) between the application service 302 and the user experience correlation system 304. The user experience correlation system 304 may communicate with the application service 302 through the network 170B. The network 170B can be a local area network (LAN), virtual private network (VPN), or any other dedicated network that connects the application service 302 to the user experience correlation system 304. The network 170B can include computers, proxies, gateways, or middle boxes with a particular range of network addresses that allow for the communications between the application service 302 and the user experience correlation system 304. Since the network 170B can be a network separate from the network 170A, the user experience system 304 may be able unable to directly monitor the application service 302 for sessions 322 between the client 165 and the application service 302.

Figure 3B:
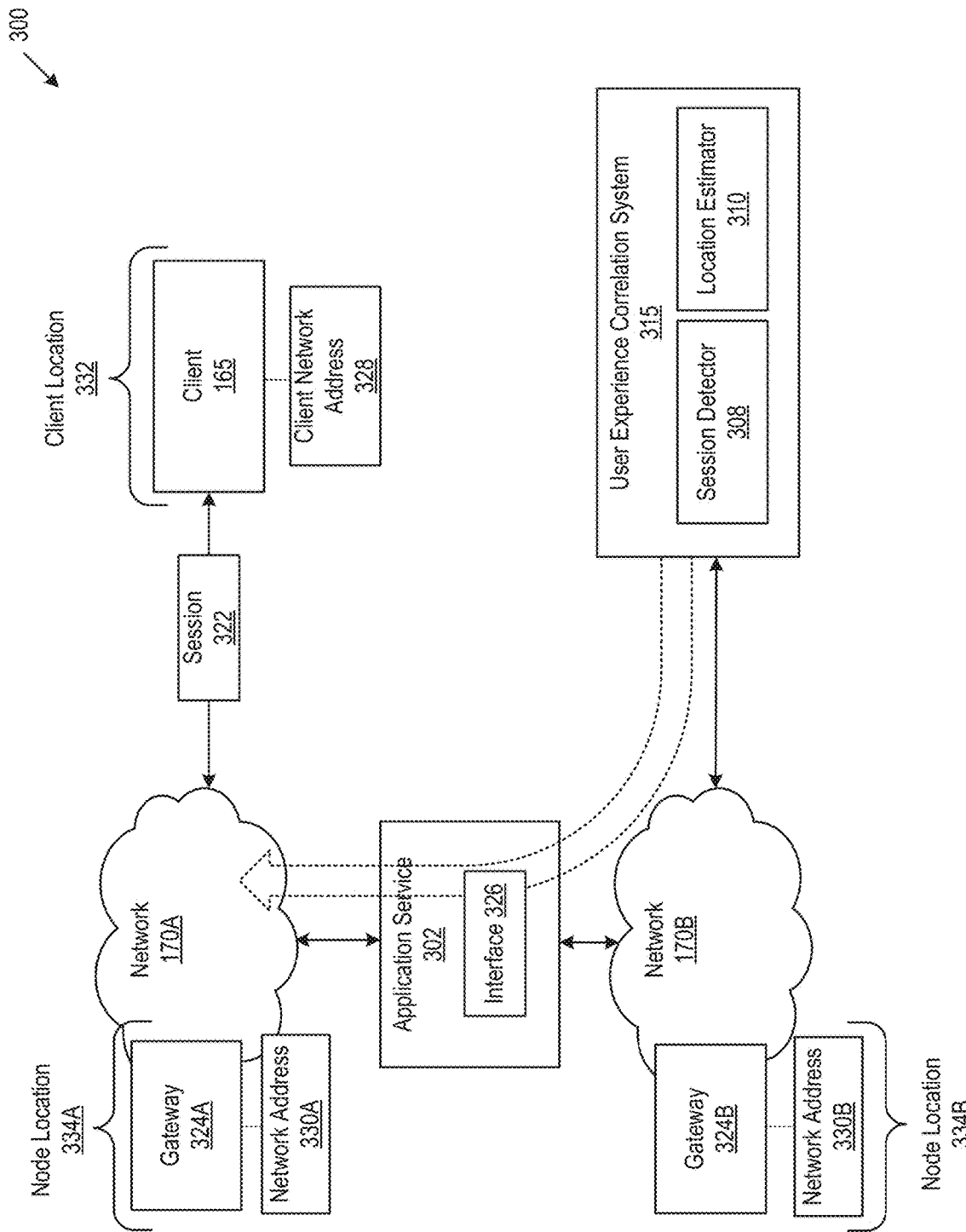
FIG. 3B is a block diagram of the system focusing on session detection and location estimation in accordance with an illustrative embodiment.

Referring now to FIG. 3B, depicted is a block diagram of the system 300 focusing on the operations of the session detector 308 and the location estimator 310. The client 165 and the application service 302 can establish a session 322. The client 165 may access the application service 302 by establishing at least one session 322 via the network 170A. The client 165 may use the network 170A to communicate with the application service 302. As discussed above, the session 322 can facilitate communications exchanged, via network 170A, between the client 165 and the application service 302. An application running on the client 165 can access resources hosted on the application service 302 via the session 322. The application running on the client 165, in performing a requested function, may attempt to access resources hosted on the application service 302 (or on the network environment) via the session 322.

The session 322 can facilitate exchange of data between the client 165 and the application service 302 over the network 170A. The client 165 may be assigned to an active directory for authentication and authorization of the client 165 and session 322. The application service 302 may use the active directory to organize the clients 165 and establish secure and authenticated sessions 322 with the client 165. The session 322 may not be directly accessible from the network 170B. The session 322 can be for streaming, API calls, or any other network service or communications. The session 322 can allow users to login from different locations to connect to a remote environment. The session 322 may identify the application service 302 from which the resources hosted on the application service 302 is to be accessed by the client 165. The application service 302 may use the active directory to organize the clients 165 and establish secure and authenticated sessions 322 with the client 165.

When the clients 165 access services or resources, the application service 302 may establish or maintain the session 322 with the client 165. The application service 302 can provide the services, resources, or applications for sets of clients 165 via a respective session 322. For instance, the application service 302 can establish a first session 322 for the application service 302 to process datasets for a first client 165, a second session 322 for the application service 302 to store data for the first client 165, and a third session 322 for the application service 302 to provide software as a service to a second client 165. The application service 302 can configure or establish each session 322 via an application protocol interface, application engine, or scalable data system.

The network 170A can have a network location corresponding to a physical location of the network 170A. The network location can include an address (e.g., street, city, region, or country) or global positioning coordinates. The network 170A can include a network address 330A corresponding to a network identifier of the network 170A. The network address 330A can be a public, static, or dynamic internet protocol (IP) address. In some embodiments, the network address 330A can be a media access control (MAC) address, hardware address, Ethernet address, physical address, subscriber identification module (SIM) address, or any other network identifier of the network 170A. The network 170A can also include ports dedicated to a particular application service 302 or session 322. Even if the network 170A is a public network, the network 170A can secure these ports and communications from third parties. Therefore, the security features of the network 170A may allow the instrumentation service 306 to monitor communications between the client 165 and the application service 302, but prevent the user experience system 304 from directly accessing or monitoring the network 170A. Additionally, the network 170A can allow the instrumentation service 306 to access to identify or view the client network address 328, the network address 330A, the client location 332, the network location, or performance factors 336 for a particular session 322.

The network 170B can have a network location corresponding to a physical location of the network 170B. The network location can include an address (e.g., street, city, region, or country) or global positioning coordinates. The network 170B can include a network address 330B corresponding to a network identifier of the network 170B. The network address 330B can be a private, static, or dynamic internet protocol (IP) address. In some embodiments, the client network address 328B can be a media access control (MAC) address, hardware address, Ethernet address, physical address, subscriber identification module (SIM) address, or any other network identifier of the network 170B. Additionally, the network 170B can allow the user experience system 304 to control or configure the establishment of the sessions 322, such as by transmitting requests from the user experience system 304 or the application service 302 to route the session 322 through the particular network 170B. The network 170B can also facilitate or allow the instrumentation service 306 or user experience system 304 to monitor the network address 330B or the node location 334B associated with the network 170B.

Each network 170A and 170B can include at least one gateway 324, and the network 170A can include a gateway 324A. The gateway 324A can intercept, manage, or monitor communications or the sessions 322 established between the client 165 in the application service 302 as they exchange data. The network 170A can also include ports dedicated to a particular application service 302 or session 322. Even if the network 170A is a public network, the network 170A can secure these ports and communications from third parties. Therefore, the security features of the network 170A may allow the instrumentation service 306 to monitor communications between the client 165 and the application service 302, but prevent the user experience correlation system 304 from directly accessing or monitoring the network 170A. Therefore, the user experience correlation system 304 can receive, from the instrumentation service 306, the network addresses and network metrics for a particular session 322.

The session detector 308 can detect or identify the session 322 between the client 165 and the application service 302 over the network 170A. The session 322 and associated information may not be directly accessible from the network 170B. With provision of the session 322 by the application service 302, the session detector 308 may identify and process the session 322. In some embodiments, the session detector 308 can access the application service 302 via the network 170B to identify the session 322 that is maintained on the network 170A and between the client 165 and the application service 302.

The session detector 308 can query the application service 302 to receive information relating to sessions 322 established by the application service 302. In some embodiments, the session detector 308 may identify one or more sessions 322 previously established between the client 165 and the application service 302. The sessions 322 between the client 165 and the application service 302 identified by the session detector 308 may include a currently active session or previous sessions. The active session can a presently existing session in which the client 165 is actively using the session 322 to access the application service 302. The previous sessions can correspond to sessions from prior time periods during which the client 165 and application service 302 establish a session 322 but are not actively exchanging data.

In some embodiments, the session detector 308 can identify the session 322 on the network 170A by using at least one interface 326 on the application service 302 to monitor the session 322. The interface 326 may facilitate access of the network 170A from the network 170B. In some embodiments, the interface 326 may be configured in accordance with an application programming interface (API). The session detector 308 can use the interface 326 to access the application service 302. The API of the interface 326 can include a computing protocol that defines calls and requests that the session detector 308 can invoke to the application service 302 relating to the sessions 322. The interface 326 can be configured on the application service 302 for the session detector 308 to, for example, identify historical data about the session 322, identify troubleshooting for client 165 or session 322 issues, or extract any other information about the session 322, among others. The interface 326 can provide a mechanism for the session detector 308 to receive information about the sessions 322 established by the application service 302. The sessions 322 identifiable via the interface 326 may include those during a particular time, those through a particular network 170 (e.g., the network 170A), or those for a particular client 165, among others. In some embodiments, the session detector 308 can store the information in the database 320.

Upon identification of the session 322, the session detector 308 can extract, identify, obtain, or receive a client network address 328 of the client 165 accessing the application service 302 over the network 170A. In some embodiments, the session detector 308 can identify a network address 330 of another node (e.g., a gateway) in the network 170A during the session 322 as the client 165 accesses the application service 302. By accessing the application service 302, the session detector 308 may identify the session 322 in the network 170A from the network 170B to which the user experience correlation system 304 is connected to. The location estimator 310 can estimate, determine, or identify a client location 332 based on the client network address 328. The client 165 can have a client location 332. The client 165 can include a client location 332 corresponding to a physical location for the client 165. The client location 332 can include an address or global positioning coordinates. The client 165 may be assigned to an active directory for authentication and authorization of the client 165 and its activities.

The client 165 can also be associated with or referenced by a client network address 328. The client network address 328 may be a network identifier of the client 165 defined in accordance with the network 170A. For example, if the network 170A is a public network, the client network address 328 can be a public internet protocol (IP) address. Conversely, if the network 170A is a private network, the client network address 328 can be a private or intranet IP address. In some embodiments, the network 170A identify the client network address 328 associated with a session 322 that is routed through the network 170A. In some embodiments, the client network address 328 can be a media access control (MAC) address, hardware address, Ethernet address, physical address, subscriber identification module (SIM) address, or any other network identifier of the client 165.

In some embodiments, the location estimator 310 can determine whether the client location 332 able to be identified from the client network address 328. The location estimator 310 can use a geolocation database to map or correspond network addresses (e.g., using public IP addresses) to physical locations. The location estimator 310 can use the geolocation database to map the client network address 328 to a country, city, zip code, or global positioning coordinates. For instance, the client network address 328 may indicate a particular physical address, city, or network region of the client 165. The location estimator 310 can store the client location 332 in the database 320. If the client location 332 is found in the geolocation database, the location estimator 310 may use the client location 332 for the client 165. Otherwise, if the client location 332 is not found in the geolocation database (e.g., null value given for IP address), the location estimator 310 may determine that the client location 332 cannot be found.

Upon the determination that the client location 332 is not found in the database, the location estimator 310 may carry out, perform, or otherwise execute a best-effort estimation of the client location 332. The best-effort estimation may be carried out by the location estimator 310 when the client location 332 is unable to be identified from the client network address 328. The best-effort estimation can be used to generate or determine an approximation of the client location 332 based on a series of other factors. The location estimator 310 can provide the best-effort estimation when the client 165 or the application service 302 utilize non-supported versions of networking equipment, software, or hardware. If the client location 332 is unavailable using direct means, a best effort estimate can be carried out to obtain the other locations as a proxy for the client location 332.

If the location estimator 310 is unable to determine the client location 332 from the client network address 328, the location estimator 310 can attempt to obtain or determine the client location 332 based on the client location 332 of the client 165 during simultaneous sessions 322 with the application service 302. In some embodiments, the client 165 may use one client device in one client location 332 to establish a plurality of sessions 322. The location estimator 310 may determine that the client location 332 for a first session 322 of the plurality of sessions 322 is unavailable. In addition, the location estimator 310 can identify the client location 332 associated with a second session 322 of the plurality of sessions 322, or the location estimator 310 can retrieve, from the database 320, a known client location 332 associated with the second session 322. The location estimator 310 can assign the identified client location 332 or the known client location 332 of the second session as the client location 332 of the first session. If the client 165 launches establishes sessions 322 and location data is unavailable for at least one of the sessions 322, the location estimator 310 can use an available client location 332 for any of the session 322 as the best-effort estimate for the unavailable client locations 332.

If the client 165 launches the currently active session 322 and the location estimator 310 is unable to determine the client location 332 from the new session 322, the location estimator 310 can attempt to determine the client location 332 from a previous client location 332 of that client 165. The location estimator 310 can analyze previous client locations 332, such as country or city, associated with a particular client 165. In some embodiments, the location estimator 310 may identify, responsive to failure to identify the client location 332 from at least one of the session 322 or the client network address 328, a client location 332 of the client 165 from a prior session 322 with the application service 302. The location estimator 310 can retrieve a history of previous client locations 332 from the database 320. The location estimator 310 can select or identify a particular time period from which to identify a previously established session 322. The location estimator 310 can retrieve a history of previous client locations 332 from the previously established session 322. The history of previous client locations 332 can indicate a known client location 332 of the client 165 during each session 322 previously established between the client 165 and the application service 302. The location estimator 310 can determine the client location 332 based on a last known client location 332 of the client 165. The location estimator 310 can also include an extract, transform, load (ETL) layer to map the client network address 328 to a file format for storing information about the client location 332 in the database 320.

If the location estimator 310 is unable to determine a client location 332 from the client network address 328 or previous client locations 332, the location estimator 310 can attempt to determine the client location 332 of the client 165 based on the network address 330A associated with the network 170A. Each network 170 (or a network node therein) can include a respective node location 334A and 334B (hereinafter generally referred to as a node location 334) and network address 330A and 330B (hereinafter generally referred to as a network address 330). At least one network node in the network 170B can have a node location 334B corresponding to a physical location of the network 170B. The node location 334B can include an address (e.g., street, city, region, or country) or global positioning coordinates. The gateway 324A can have a node location 334A corresponding to a physical location of the gateway 324A. The node location 334A can include an address (e.g., street, city, region, or country) or global positioning coordinates. Based on the network address 330A, the location estimator 310 can determine the client location 332 from the node location 334 when the location estimator 310 is unable to access the network 170A to retrieve information about the client network address 328, a client 165 includes an unresolved client network address 328. For example, the client 165 obfuscates or blacklists its client location 332 and/or client network address 328 (such as due to regulatory or privacy reasons), or a mapping of the client network address 328 to a client location 332 is unsupported in a particular region of the client 165.

In this case, the location estimator 310 can determine the node location 334 based on the network address 330. Since a session 322 between the client 165 and the application service 302 may also be maintained on the network 170 having the node location 334, the location estimator 310 can use the node location 334 as the client location 332. For instance, the session 322 may be maintained by the network 170A. By determining the node location 334A of the network 170A, the location estimator 310 can use the node location 334A corresponding to the network 170A for the client 165 to estimate the client location 332 or use the determined node location 334A as the client location 332. The location estimator 310 can also use the location attributes (e.g., node location 334B) of networking components (e.g., a gateway or a proxy) of a private network (e.g., network 170B) as the client location 332. The location estimator 310 can estimate the node location 334 based on a network address 330 associated with the session 322. The location estimator 310 can identify a gateway or proxy within the network 170. The location estimator 310 can retrieve the network address 330 of the gateway or the proxy. The location estimator 310 can retrieve the network address 330 from the database 320, and the network address 330 can be identified by the session detector 308. The location estimator 310 can look up the network address 330 in a directory or geolocation database. The geolocation database can indicate where the network 170 (or its gateway or proxy residing in the network 170A) having the particular network address 330 may be physically located. The location estimator 310 can map the network address 330 to a country, city, zip code, or global positioning coordinates. In some embodiments, the location estimator 310 can retrieve, from a directory, a country, city, or address for the node location 334 associated with the network address 330.

If the location estimator 310 is unable to determine a client location 332 from the network address 330, the location estimator 310 can attempt to determine the client location 332 of the client 165 based on a location of the application service 302. The location estimator 310 can determine location of the application service 302 based on its network address, and the then estimate the client location 332 based on the location of the application service 302. The location estimator 310 can retrieve, from a directory, a country, city, or address the location of the application service 302 associated with a particular network address. The location estimator 310 can look up the network address in a directory or geolocation database. The geolocation database can indicate where the application service 302 having the particular network address may be physically located. More specifically, the location estimator 310 can map the network address of the application service 302 to a country, city, zip code, or global positioning coordinates. By determining the location of the application service 302, the location estimator 310 can then use the location corresponding to the application service 302 to estimate the client location 332 or use the location of the application service 302 as the client location 332.

In some embodiments, the location estimator 310 may use a fallback determination to identify the client location 332. The fallback determination may be in response to being unable to determine the client location 332 using other factors under the best effort estimation. The location estimator 310 may access a service (e.g., a storefront service) to retrieve or identify the last known client network address 328 for the client 165. The service may be connected with the network 170A and 170B. In some embodiments, the service may provide the client network address (e.g., public IP address) corresponding to the client 165.

Figure 3C:
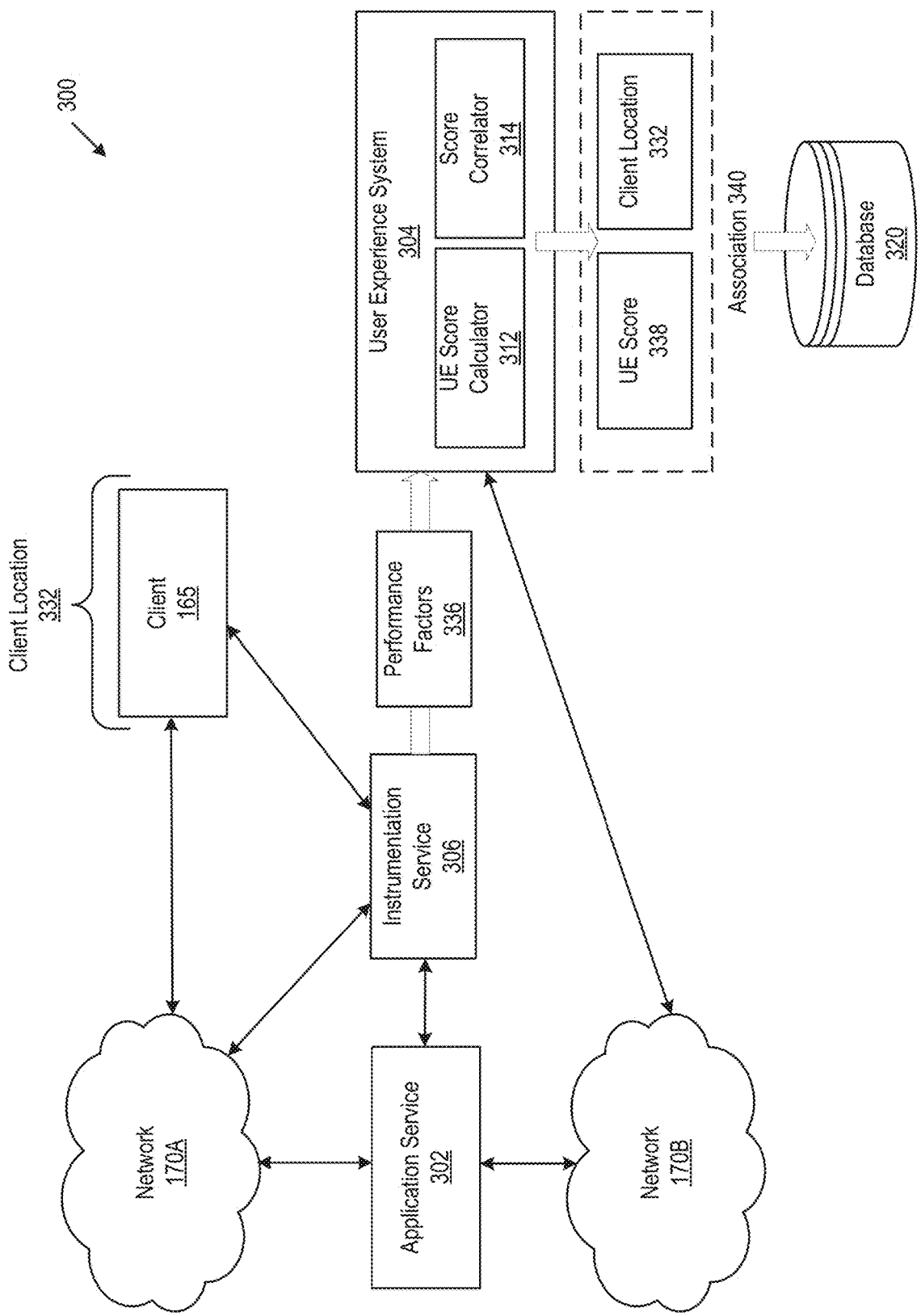
FIG. 3C is a block diagram of the system focusing on user experience score determination and correlation with location in accordance with an illustrative embodiment.

Referring now to FIG. 3C, depicted is a block diagram of the system 300 focusing on the operations of the UE score calculator 312 and the score correlator 314. As the client 165 accesses the application service 302, the instrumentation service 306 may monitor each application instance for each client 165. By monitoring the session 322, the instrumentation service 306 may determine measure, or otherwise identify one or more performance factors 336 relating to the client 165 in accessing the application service 302 via the session 322 over the network 170A. The instrumentation service 306 may gather information or metrics about the client 165 or network 170 relating to the services, resources, or application instances. The instrumentation service 306 can acquire performance factors 336 of sessions 322 routed through the network 170B. By monitoring the session 322, the instrumentation service 306 may determine measure, or otherwise identify one or more performance factors 336 relating to the client 165 in accessing the application service 302 via the session 322 over the network 170A.

The one or more performance factors 336 can include metrics such as network performance or client 165 experience relating to the session 322. The performance factors 336 can include network performance metrics relating to session 322 duration, operating system or hardware used, network latency, round trip time values between the client 165 and the application service 302, or connection reconnects and failures between the client 165 and the application service 302. The logon duration can indicate how much time the session 322 was active in maintaining an information exchange between the client 165 and the application service 302. The network latency can indicate processing delays relating to time it takes the network 170 to process packet headers associated with the session 322, queuing delays relating to time spent by the packets in routing queues, transmission delays relating to time taken to push the packets into the session 322, propagation delays relating to time taken for signals of the session 322 to travel between the client 165 and the application service 302. The round trip time values can indicate how much time it takes for data packets to be sent from client 165 and for an acknowledgment of that packet to be received back at the client 165. The number of connection reconnects and failures can indicate the number of times that the client 165 and the application service 302 underwent a failed session 322 that had to be restarted or reconnected. The session 322 or performance factors 336 may be identified by the user experience correlation system 304 or by the application service 302.

In general, the client location 332, the client network address 328, the node location 334, or the network address 330 can affect the performance factors 336. For instance, if network 170A is geographically distant from the client 165 or application service 302, then the performance factors 336 may indicate a poor user experience. Similarly, if the network 170A is blocked or throttled for the client 165, then the performance factors 336 may also indicate a poor user experience. Upon identification, the instrumentation service 306 may store and maintain the performance factors 336 for the client 165 in accessing the application service 302 via the session 322 over the network 170A.

The UE score calculator 312 may retrieve, identify, or otherwise receive performance factors 336 for the client 165 from the instrumentation service 306. Upon receipt of the performance metrics 336, the UE score calculator 312 may analyze the performance factors 336 to determine a client 165 experience while it accesses the resources hosted on the application service 302. Each of the plurality of performance factors 336 may be associated with the access to the application service 302 by the client 165. The plurality of performance factors 336 can be associated with a particular session 322 between the client 165 and the application service 302 over the network 170A.

Based on the performance factors 336, the UE score calculator 312 may calculate, generate, or otherwise determine a user experience score 338 for the client 165 while accessing the resources hosted on the application service 302. The user experience score 338 can indicate network performance or user satisfaction relating to the use of products, services, or applications provided by the application service 302 during the session 322. The UE score calculator 312 can calculate user experience score 338 for the entire session 322 or for each time segment of the session 322, such as during logon, use, and termination.

In some embodiments, the UE score calculator 312 may calculate the user experience score 338 based on the performance factors 336, relative weights of the performance factors 336, relative weights of the sessions 322, or a correction factor. The UE score calculator 312 may calibrate the performance factors 336 to predetermined thresholds by adjusting the performance factors 336 based on offset values such as minimum round trip times or maximum logon duration. The UE score calculator 312 can also weigh the performance factors 336 by considering a performance factor 336 such as session reconnects to have a greater effect on the user experience score 338 than a performance factor 336 such as packet round trip times. Similarly, the UE score calculator 312 can weigh performance factors 336 by considering high priority sessions 322, such as those maintaining a system critical application service or live streaming, to have a greater effect on the user experience score 338 than lower priority sessions 322, such as those relating to file sharing.

The UE score calculator 312 can then apply a corrective factor to the calculated user experience score 338 at the client 165 level by considering the performance factors 336 from a plurality of clients 165 for a particular session 322. A high user experience score 338 can indicate a long logon duration, short round trip time values between the client 165 and the application service 302, or infrequent connection reconnects and failures between the client 165 and the application service 302. In contrast, a low user experience score 338 can indicate a short logon duration, long round trip time values between the client 165 and the application service 302, or frequent connection reconnects and failures between the client 165 and the application service 302. The UE score calculator 312 can store the calculated user experience score 338 in the database 320.

With the determination of the client location 332 and the user experience score 338, the score correlator 314 may correlate or associate the client location 332 and the user experience score 338. The score correlator 314 may correlate or associate the client location 332 and the user experience score 338 to determine, obtain, or generate an association 340 between user experience score 338 and the client location 332. In some embodiments, the score correlator 314 may store and maintain the association 340 between the user experience score 338 and the client location 332 onto the database 320. The score correlator 314 may generate each association 340 using statistical analysis to determine where there is a relationship between locations and user experience scores 338. The score correlator 314 may determine the extent to which the user experience score and client location 332 have a predictive relationship that can be used by the user experience correlation system 304 to optimize network services. The score correlator 314 may store each association 340 in a data structure in the database 320.

In some embodiments, the score correlator 314 may group, categorize, or identify user experience scores 338 for a particular client 165 at various client locations 332. The score correlator 314 can identify that the user experience score 338 is in a first range for a first client location 332, and in a second range for a second client location 332. The score correlator 314 can then associate certain client locations 332 with certain ranges of user experience scores 338. The associations 340 generated by the score correlator 314 can identify network degradations for clients 165 unique to any particular client location 332. The score correlator 314 may store the association 340 in the database 320. The score correlator 314 can thus identify and monitor how a user experience score 338 changes for a client 165 depending on their location.

Statistical information relating to the association 340 of client location 332 and user experience scores 338 may highlight client location 332 associated with various client 165 experiences or user experience scores 338. In some embodiments, the score correlator 314 may correlate or associate the user experience score 338 with other clients 165 based on the determined client location 332. The score correlator 314 can compare client locations 332 of other clients 165 with each other to identify clients 165 with client locations 332 to identify, select, or find clients 165 that are within a predetermined distance of each other. The score correlator 314 can then assign the client locations 332 within the predetermined distance to a group of clients 165 having similar client locations 332. Similarly, the score correlator 314 can classify client locations 332 by region, country, or geographic area.

The score correlator 314 can then assign clients 165 having a particular region, country, or geographic area to a group corresponding to the particular region, country, or geographical area. The score correlator 314 can correlate the user experience score 338 of a particular client 165 with other clients 165 of the group to determine or identify whether the user experience score 338 is anomalous for a particular client 165 and client location 332. Similarly, the score correlator 314 can correlate the user experience score 338 to client locations 332 of other clients to identify or determine whether a particular client location 332 is associated with a particular user experience score 338. The score correlator 314 may store each group in the database 320, and which clients 165 are assigned to which group. The score correlator 314 can also store the correlations between the user experience scores 338 and groups in the database 320.

The score correlator 314 may group, categorize, or identify user experience scores 338 by location such as node locations 334 or regions. The score correlator 314 can thus create a table or mapping of user experience scores 338 at various locations. Location attributes of networking components (e.g., a gateway) can thus be correlated with user experience scores 338, and analyzed if particular user experience scores 338 are related to particular networking components in particular locations.

In some embodiments, the score correlator 314 can also associate or correlate the user experience score 338 to particular sessions 322 types to determine or identify whether a particular application or service associated with a particular sessions 322 is associated with certain user experience scores 338. While the user experience score 338 corresponds to a particular session 322, the score correlator 314 can retrieve the calculated user experience score 338 from the database 320 for analysis during or after the session 322. The score correlator 314 can identify the calculated user experience score 338 from the database 320 during the session 322 to correlate the user experience score 338 to potential adjustments during the session 322, such as a refresh of an application or service. The score correlator 314 can determine how a potential change in the session 322 will affect the user experience score 338. The score correlator 314 can retrieve or identify the calculated user experience score 338 after the session 322 completes or terminates to compare the user experience score 338 for the session 322 with other completed or terminated sessions 322 from the database 320. The score correlator 314 can compare the sessions 322 of one client 165 or of several clients 165.

In some embodiments, the score correlator 314 can determine a correlation between particular applications or services with user experience scores 338 across a plurality of sessions 322. The score correlator 314 can use cross-correlation to identify how certain sessions 322 can affect the user experience scores 338 of other sessions 322. If a session 322 is associated with a low user experience score 338, then the score correlator 314 can use cross-correlation to identify that establishing the sessions 322 simultaneously with other sessions 322 is associated with lower user experience scores 338 for those other sessions. Similarly, if a particular session 322 type, such as computationally extensive data processing, is associated with a low user experience score 338, then the score correlator 314 can identify or predict that the establishing a session 322 for that type of session may lower the user experience score 338. In contrast, if a particular session 322 type, such as file sharing, is associated with a high user experience score 338, then the score correlator 314 can identify or predict that the establishing a session 322 for that type of session may increase the user experience score 338.

In some embodiments, the score correlator 314 can calculate, generate, or otherwise determine a correlation (e.g., autocorrelation or cross-correlation) to identify a correspondence of the user experience scores 338 during time segments of each session 322 to identify patterns over time for particular sessions 322. For example, the user experience scores 338 may be low in sessions 322 at peak usage time, but high user experience scores 338 during off-peak usage. The score correlator can also use autocorrelation to identify patterns in overall user experience scores 338, such as a pattern of high user experience scores 338 for a particular client 165 during a particular time of the day. By identifying that certain events associated with a session, such as the refresh of the application or service, correlate with changes to the user experience score 338, the score correlator 314 can identify or predict changes to the user experience score 338 if those events occur.

Figure 3D:
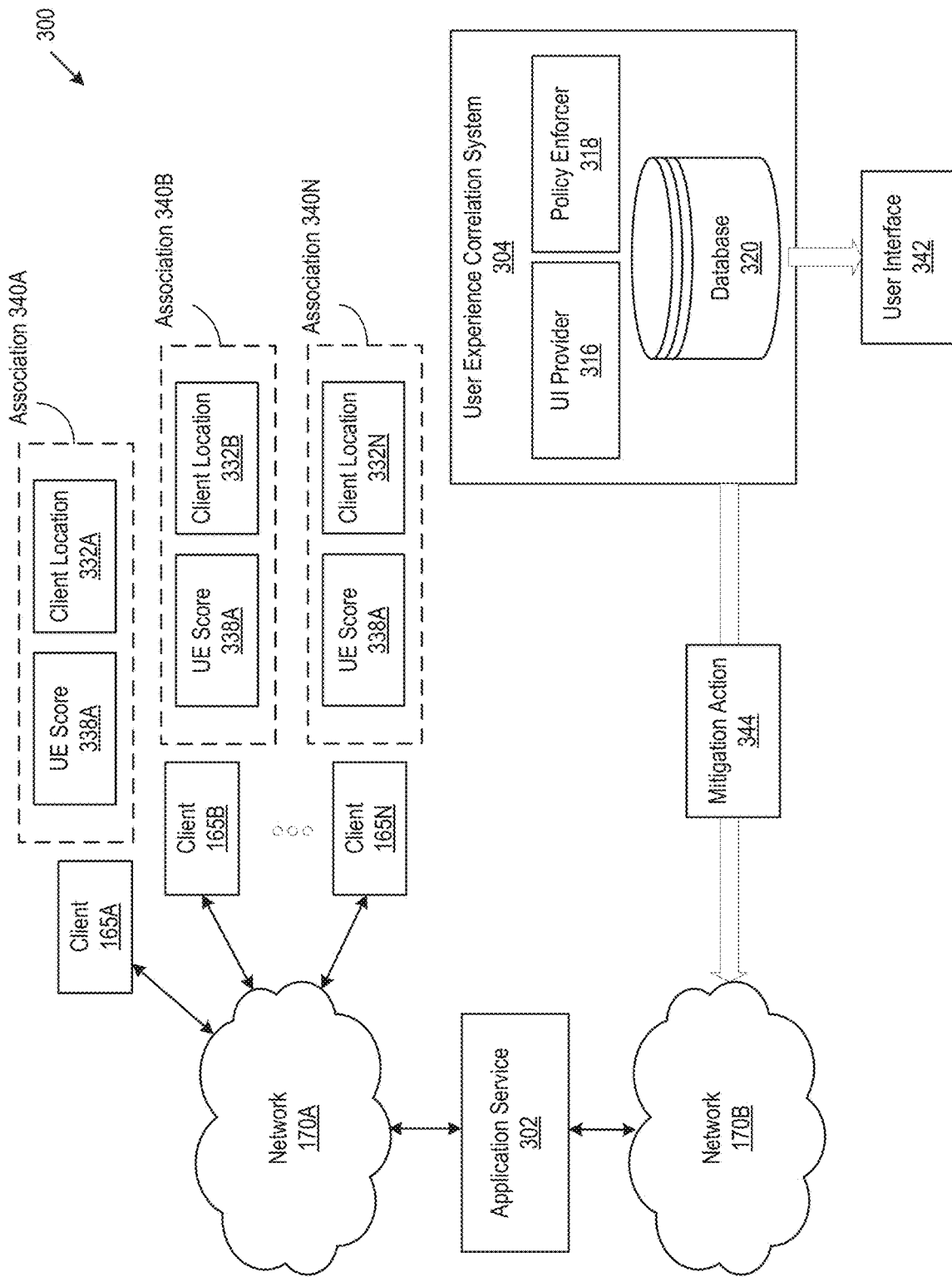
FIG. 3D is a block diagram of the system focusing on provision of instructions to perform an action based on the associations between the location of a client and the user experience score in accordance with an illustrative embodiment.

Referring now to FIG. 3D, depicted is a block diagram of the system 300 focusing on the operations of the UI provider 316 and the policy enforcer 318. The UI provider 316 can generate, create, or otherwise provide instructions based on the association 340 between the user experience score 338 and the client location 332 for the client 165. The instructions may be for provision of a graphical user interface 342 to present the associations 340 between user experience score 338 and client locations 332 in a graphical user interface 342. The graphical user interface 342 provided by the UI provider 316 may be presented on a display communicatively coupled with the user experience correlation system 304. The UI provider 316 can retrieve the associations 340 from the database 320 for display in the graphical user interface 342 during or after the session 322. The UI provider 316 can also provide heuristic location based analytics based on the based on the client location 332 and user experience score 338. Based on the associations 340 generated by the score correlator 314 and stored in the database 320, the UI provider 316 can use the heuristic location based analytics to display approximations of how client locations 332 or node locations 334 may affect the user experience score 338.

In some embodiments, the UI provider 316 can display user experience scores 338 associated with particular client locations 332 or particular node locations 334. If a particular session 322 can be routed through one of two node locations 334, then the UI provider 316 can use the heuristic location based analytics to display a predicted user experience score 338 for each node location 334 based on the user experience scores 338 associated with each node location 334. If one node location 334 is associated with high user experience scores 338 for the session 322 than the other node location 334, then the UI provider 316 can identify the node location 334 with the higher user experience score 338 for routing the particular session 322.

The UI provider 316 can display approximate changes in user experience score 338 for a client 165 responsive to receiving a potential adjustment in client location 332 or node location 334. In some embodiments, the graphical user interface 342 can also list the networks 170, and their node location 334 and network address 330, that the client 165 is connecting to. In some embodiments, the UI provider 316 may provide a graphical user interface 342 for presentation of an indicator identifying the association 340 between the user experience score 338 for the client 165 with the client location 332 or node location 334. The UI provider 316 can provide the indicators for presentation to identify or highlight client locations 332 or node locations 334 experiencing various user experience scores 338. The UI provider 316 can thus present client 165 security or network performance insights and display geo-fencing capabilities.

Figure 4A:
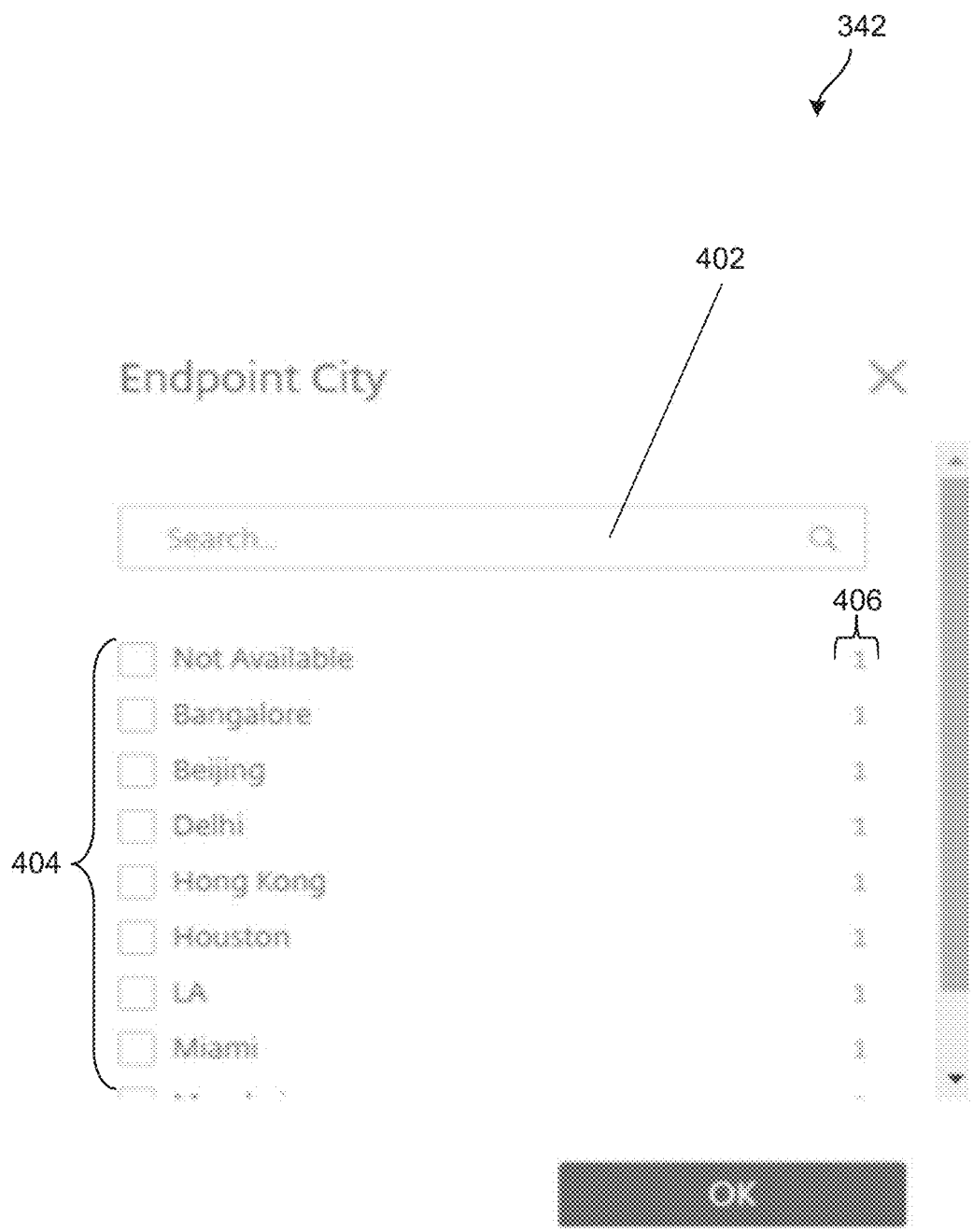
FIGS. 4A and 4B each are a graphical user interface for displaying client experience for a client along with a location in accordance with an illustrative embodiment.

Now referring to FIG. 4A, depicted is an embodiment of a graphical user interface 342 presented by the UI provider 316 for selecting to display the client experience at different client locations 332. The UI provider 316 can provide the determined client locations 332 to a network administrator to view the experience of the client 165 at various client locations 332 or to view several clients 165 experiences at a particular location. The graphical user interface search 402 can allow a network administrator to input client locations 332. Similarly, the location list 404 allows a network administrator to select client locations 332 from a list. For example, the UI provider 316 can receive a selection of Bangalore in the location list 404 and display information relating to user experience score 338, client network address 328, performance metrics 336, or any other network session 322 information of clients 165 that have a client location 332 corresponding to Bangalore. The UI provider can similarly receive selections of Beijing, Delhi, Hong Kong, Houston, LA, or Miami to display the clients 165 that have a client location 332 corresponding to those cities. The location numbers 406 can indicate a number of sessions 322 or clients 165 at a particular client location.

Figure 4B:
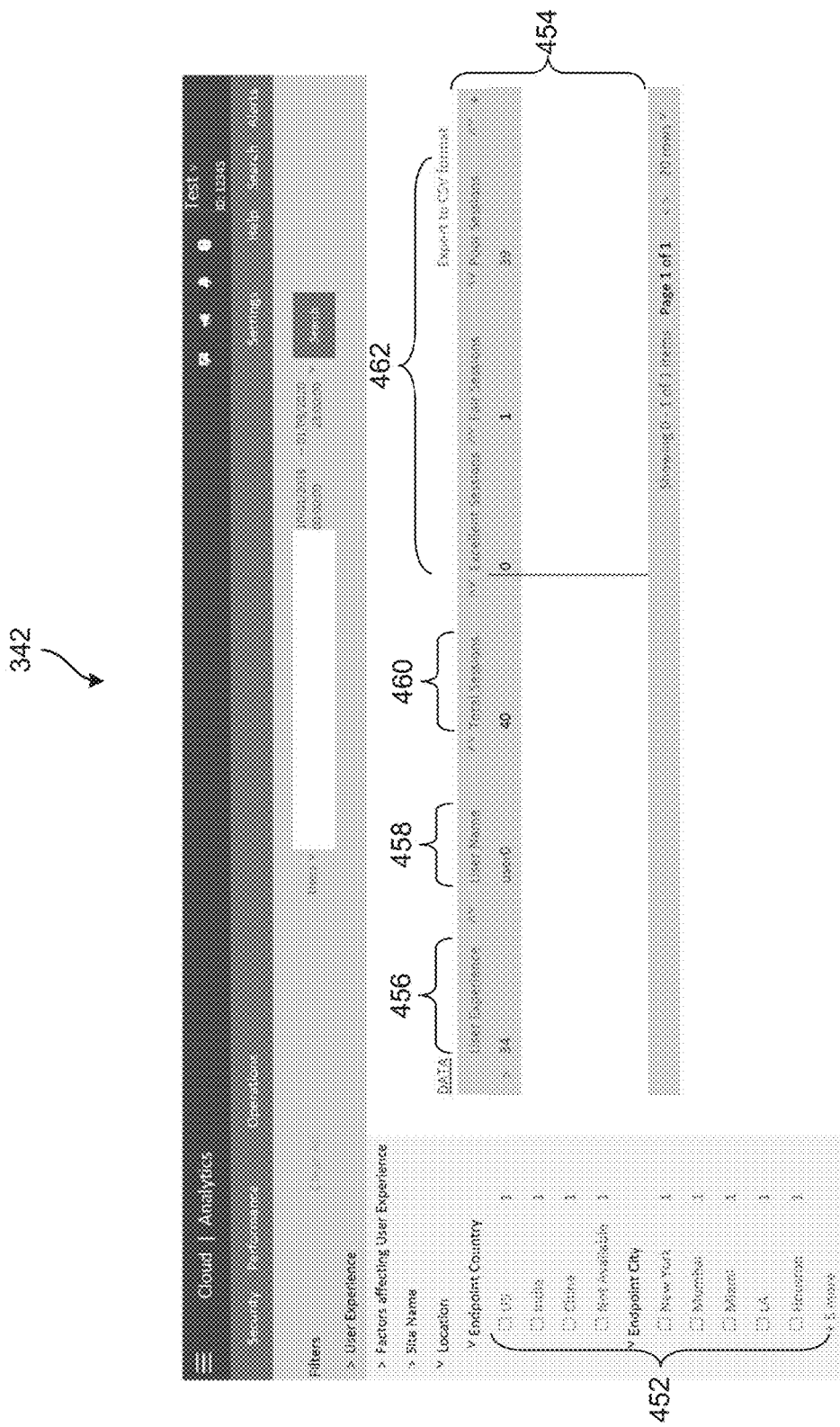

Now referring now to FIG. 4B, depicted is an embodiment of a graphical user interface 342 for displaying client 165 experience at different locations. The graphical user interface can include the selectable location list 452 that corresponds to various locations where sessions 322 are maintained, such as client locations 332 and node locations 334. The graphical user interface can also list each client 165 in the information table 454. The information table 454 can include columns for each client 165 that indicate a user experience score 456, a user name 458, a total sessions 460, and session types 462. The user experience score 456 can indicate the user experience score 338 calculated by the UE score calculator 312. The user name 458 can indicate demographic information associated with the client 165, such as their name or client identifier. The total sessions 460 can indicate a total number of sessions 322 that included the particular client 165. The session types 462 can indicate a number of sessions 322 having user experience scores 338 within a certain range. For instance, the session types 462 can indicate a number of sessions 322 that included a user experience score 338 in an excellent range, a fair range, or a poor range. The session types 462 and associated categories or groupings can be based on thresholds established by the policy enforcer 318. For instance, each session 322 classifier as poor may have a user experience score 338 below the predetermined threshold determined by the policy enforcer 318.

Now referring back to FIG. 3D, in some embodiments, the UI provider 316 can also generate and provide a heat-map of geographical locations (or other indicator on a graphical user interface) along with associated user experience scores 338 at various client locations 332 or node locations 334. The heat-map can be known as a geo-map and can be color coded based on user experience scores 338, client location 332, and/or node location 334. For instance, red colors on the map can indicate a low user experience score 338 in that location, yellow can indicate a medium user experience score 338 in that location, and blue or green can indicate an excellent user experience score 338 in that location. Accordingly, the UI provider 316 can visualize network performance of sessions 322 by client location 332 and node location 334. A network administrator can detect degradations to client 165 experience based on particular locations using the heat map. If the UI provider 316 maps user experiences scores by network performance, then degradations to the client 165 experience can be mapped on a location basis and every location can have a characteristic performance metric.

The policy enforcer 318 can determine, generate, or otherwise provide instructions to perform at least one action based on the associations 340 between the user experience scores 338 and the client location 332. Using the client experience at a particular client location 332, the policy enforcer 318 can generate instructions for performing mitigation actions 344 for the client 165 at that particular client location 332. In some embodiments, the policy enforcer 318 may carry out the mitigation actions 344. The policy enforcer 318 generate instructions to reconfigure the session 322 to carry out the mitigations actions. The instructions may be sent to a network administrator, such as by displaying the instructions by the UI provider 316. For example, the network administrator can be presented with an option of mitigation actions 344 to perform to address the user experience scores 338 for clients 165 of certain client locations 332. The instructions can also be sent to the application service 302 for the application service 302 to carry out. The policy enforcer 318 can also provide instructions for performing mitigation actions 344 at similar client locations 332 based on similar user experience scores 338 at those similar locations. The policy enforcer 318 can also provide instructions for performing mitigation actions 344 by the application service 302 based on user experience scores 338 associated with that application service 302. Similarly, the policy enforcer 318 can provide instructions for performing mitigation actions 344 relating to a particular network 170, such as to reroute a session 322 via a different network 170, based on user experience scores 338 associated with the particular network 170.

In addition, the policy enforcer 318 can identify client user experience scores 338 at particular node locations 334 (or client locations 332). The policy enforcer 318 can identify the client 165 experience relative to the user experience of other clients 165 at a similar client locations 332 or node locations 334. The policy enforcer 318 can identify user experience scores 338 at particular client locations 332 or node locations 334 for each client 165. The policy enforcer 318 can then determine an average user experience score 338 at the particular client location 332 or node location 334 to classify the particular node location 334. For instance the policy enforcer 318 can classify the client location 332 or the node location 334 as having user experience scores 338 indicating excellent network performance. The policy enforcer 318 can also compare the identified user experience scores 338 of the clients 165 to identify any clients 165 that have user experience scores 338 that differ by more than a predetermined threshold from the average user experience scores 338 of other clients 165. The policy enforcer 318 can then configure or generate the instructions to resolve any issues affecting the client 165 experience.

In some embodiments, the policy enforcer 318 may determine a cause of the user experience score 338. The cause may include location-based causes, client-specific causes, or network-based causes, among others. For example, a network-based cause may be that a session 322 is established on a network 170A that that is associated with an average user experience score 338 indicating unsatisfactory performance. In addition, a location-based cause may be that a session 322 is established to a client location 332 that is associated with an average user experience score 338 indicating unsatisfactory performance. A client-specific cause may be an identification that the particular client 165 has a relatively lower user experience score 338 relative to client 165 in similar locations or connected to the same network. The policy enforcer 318 can also identify the that user experience scores 338 below the threshold are associated with certain performance factors 336, such as numerous connections reconnects or long round trip times. Similarly, the policy enforcer 318 can identify application services 302 or their sessions 322 that are associated with a particular client 165 experience. The policy enforcer 318 can identify that user experience scores 338 below the threshold are associated with particular sessions 322 or application services 302, such as those relating to complex data processing or incompatible operating systems. In some embodiments, to determine the cause, the policy enforcer 318 can determine whether a user experience score 338 is less than a threshold score based at least on the client location 332 of the client 165. The policy enforcer 318 can identify client locations 332 or node locations 334 where clients 165 have user experience scores 338 greater than the threshold score.

Conversely, the policy enforcer 318 can identify client locations 332 or node locations 334 where clients 165 have user experiences scores below the predetermined threshold. For a particular client 165 determined to have a user experience score 338 lower than the threshold score, the policy enforcer 318 can identify one or more other clients 165 with client locations 332 within a predetermined distance around the client 165 (e.g., 10 to 160 km). For example, the policy enforcer 318 may have determined that the user experience score 338A associated with a client 165A is below a threshold score. Upon the determination, the policy enforcer 318 can query or identity clients 165B-165N that have client locations 332B-332N that are within a predetermined distance of the client location 332A of the client 165A. With the identification of the nearby clients 165B-165N, the policy enforcer 318 can query the user experience scores 338B-338N of clients 165B-165N. The policy enforcer 318 can then compare the user experience score 338A of the client 165A with the user experience scores 338B-338N of other clients 165B-165N. Based on the comparison, the policy enforcer 318 can determine the cause of the user experience scores 338. When the difference among the user experience scores 338A-338N is less than a marginal threshold, the policy enforcer 318 can determine the cause as location-based (e.g., based on nearby client location 332A-332N). On the other hand, when the difference among the user experience scores 338 is greater than the marginal threshold, the policy enforcer 318 can determine the cause as client-specific (e.g., based on one or more of the clients 165A-165N).

The policy enforcer 318 can similarly identify one or more other clients 165 associated with node location 334 within a predetermined distance around the client 165 (e.g., 10 to 160 km) or connected to the same network 170 (e.g., the network 170A or proxy within the network 170A). For example, the policy enforcer 318 can compare the user experience score 338 of the client 165 with the user experience scores 338 of other clients 165 that are also associated with the node location 334. Based on the comparison, the policy enforcer 318 can determine that the node location 334 is the cause of the user experience score 338. Similarly, when the difference among the user experience scores 338 is less than a marginal threshold, the policy enforcer 318 can determine the cause as network-based (e.g., caused by a particular network 170 or gateway 324). On the other hand, when the difference among the user experience scores 338 is greater than the marginal threshold, the policy enforcer 318 can determine the cause as client-specific (e.g., caused by a particular client 165).

The policy enforcer 318 may determine or generate the instruction to provide for at least one mitigation action 344 to be performed to the session 322 between the client 165 and the application service 302. The generation may be in response to determining that the user experience score 338 of the client 165 is less than the threshold score. In some embodiments, the policy enforcer 318 may select, determine, or otherwise generate the mitigation action 344 based on the cause determined for the user experience score 338 of a particular client. For example, as depicted, the policy enforcer 318 can transmit the mitigation action 344 to the application service 302 via the network 170B. The application service 302 can receive the mitigation action 344 and perform the mitigation action to address network issues.

The mitigation action 344 may include a redirection of the client 165 to a different application service 302 or a rerouting of the client 165 through another network 170. If the network 170A is associated with the node location 334A that is geographically distant from the client 165 or application service 302, then the policy enforcer 318 may request the application service 302 to route the session 322 through a network 170 that is closer to the client 165 or application service 302. Similarly, if the network 170A is associated with network address 330A that is blocked or throttled for the client 165, then the policy enforcer 318 may request the application service 302 to have the network 170A issue a new network address 330A or route the session 322 through a different network 170 such as network 170B. Additionally, the policy enforcer 318 can notify a network administrator to request corrective action or other adjustments relating to the network 170.

The mitigation action 344 may include a reconfiguration of the application service 302. The policy enforcer 318 can request the application service to assign a higher service priority to a particular client 165 to provide improved networking services. The policy enforcer 318 can also configure the application service 302 to update the software application provided to the client 165. Similarly, the policy enforcer 318 can request the application service 302 to reestablish the session 322 to refresh the associated client network address 328 and the network address 330. The policy enforcer 318 can notify a network administrator to request corrective action or other adjustments for the application service 302.

The mitigation action 344 may include a reconfiguration of the session 322. The policy enforcer 318 can request the application service 302 to establish the session 322 using a different security protocol or streaming protocol. The policy enforcer 318 can also request the application service 302 to refresh the session 322 or establish a new session 322. Similarly, the policy enforcer 318 can request the application service 302 to establish the session 322 with a different client network address 328 that is nonetheless associated with the client 165 (such as a secondary or backup server of the client 165). Additionally, the policy enforcer 318 can notify a network administrator to request corrective action or other adjustments relating to the session 322.

Moreover, the one or more components of the user experience correlation system 304 can monitor for, detect, or identify changes in client locations 332 and associate the changes with any detections of degradations to client 165 experience. The location estimator 310 may detect a change or update to the client location 332 or the node location 334. The location estimator 310 can store the updated client location 332 or the node location 334 in the database 320. The policy enforcer 318 can then retrieve the updates to the client location 332 or node location 334 from the database 320. Similarly, the session detector 308 may detect a change or update to the client network address 328 or the network address 330. The session detector 308 can store the updated client network address 328 in the database 320. The policy enforcer 318 can then retrieve the updates to the client network address 328 or network address 330 from the database 320. Therefore, in addition to observing degradations specific to a client location 332, if degradations are observed for a client 165, then the policy enforcer can determine that the change in address or location caused the performance degradation. Similarly, the policy enforcer 318 may detect or determine a change to the user experience score 338 for the client 165 based at least on additional performance factors 336 identified or received subsequent to any initial performance factors 336. Based on the additional performance factors 336, the UE score calculator 312 can update user experience score 338, which can cause the policy enforcer 318 to detect the update and adjust the enforcement of policies such as those relating to mitigation actions 344.

Subsequently, the score correlator 314 can update the associations 340 or generate new associations 340, such as if the client location 332, client network address 328, or performance factors 336 change. In some embodiments, the score correlator 314 may detect, via the application service 302, a change in the client network address 328 of the client 165 within the network 170A or network 170B. The score correlator 314 may update, responsive to detecting the change, the client location 332 and the association 340 between the client location 332 and the user experience score 338 for the client 165. In some embodiments, the score correlator 314 may identify a second association 340 between the client 165 and one or more other clients 165 accessing the application service based at least on a client locations 332 for each of the one or more other clients 165. In some embodiments, the score correlator 314 may detect a change to the user experience score 338 for the client 165. The score correlator 314 may update the association 340 between the client location 332 and the user experience score 338 in accordance with the change to the user experience score 338. The score correlator 314 can store each association 340 in the database 320, and then update the stored association 340 in the database 320.

The UI provider 316 can provide an indication of the changes to the client location 332, client network address 328, or performance factors 336. The UI provider 316 can provide the indications by displaying graphical indicators to notify a network administrator of the changes. Similarly, the UI provider 316 can generate and transmit alerts to the network administrator to notify them of the changes. The UI provider 316 can generate an alert to indicate which changes occurred, such as that the client location 332 changed from a first region to a second region. The UI provider 316 can transmit the alert for display in the graphical user interface 342.

In this manner, the system 300 can provide network administrators with a heuristic location based analytics system based on a holistic approach of correlating client location 332 and user experience during a session 322 between the client 165 and the application service 302. However, obtaining the client location 332 to correlate it to the user experience of the user with the client location 332 can be difficult. Without an association 340 between client location 332 and user experience score 338, a network administrator may face significant difficulty or may be unable to analyze the session 322 to manage network configurations and perform fault analysis of the network. Lacking the ability to manage network configuration or perform fault analysis, network issues (e.g., network delay, packet loss, and service outages) between the end users and application services may persist.

To that end, the session detector 308 in the second network 170B can identify the session 322 in the first network 170A. From the identified session 322, the location estimator 310 may determine the client location 332 of the client 165 either directly from the client network address 328 or via a best effort estimation of the client location 332. The determination of the client location 332 from the session 322 or other techniques under the best effort estimation may be more provide for a more accurate location relative to using an active directory or inaccurate approximation techniques. By relying on other factors (e.g., the previous locations of the client 165 and the network 170), the location estimator 310 can more accurately determine the client location 332 to a particular location. The UE score calculator 312 can also calculate a user experience score 338 for the client 165 during the session based on performance factors 336 relating to the session 322, such as the duration, operating system or hardware used, network latency, round trip time values between the client 165 and the application service 302, or connection reconnects and failures between the client 165 and the application service 302.

With the determination of the user experience score 338 and the client location 332, the score correlator 314 can then determine an association 340 between the client location 332 and the user experience score 338 during the session 322. The score correlator 314 can use the association 340 to identify client locations 332 in which end users are experiencing unsatisfactory user experiences, and perform additional analysis to pinpoint a cause for the low user experience, such as the network-related factors, user-specific issues, or other configuration-related problems. The UI provider 316 can present the associations 340 and potential mitigation actions 344 to a network administrator, such as in the graphical user interface 342, for further analysis of the cause of the abnormal condition.

In addition, using the correlation between client location 332 and user experience, the policy enforcer 318 can determine countermeasures to address the network issues, and carry them out in an automated or semi-automated fashion. Specifically, the policy enforcer 318 can generate an instruction to perform a mitigation action 344 when the association 340 reflects an abnormal condition, which allows the application service 302 to automatically reconfigure the session 322 to avoid an unsatisfactory user experience for the client 165 during the session 322. The system 300 thus may provide for the detection of client location 332 and the collection of performance factors 336 for improved network monitoring and optimization. The system 300 (or network administrator) can use the location and user experience to analyze the network 170 that clients 165 from a common or similar location are using, and configure network settings or route packets for an associated remote environment such as the session 322 in a way that improves network metrics relating to latency, round trip time, reliability, or availability.

Figure 5A:
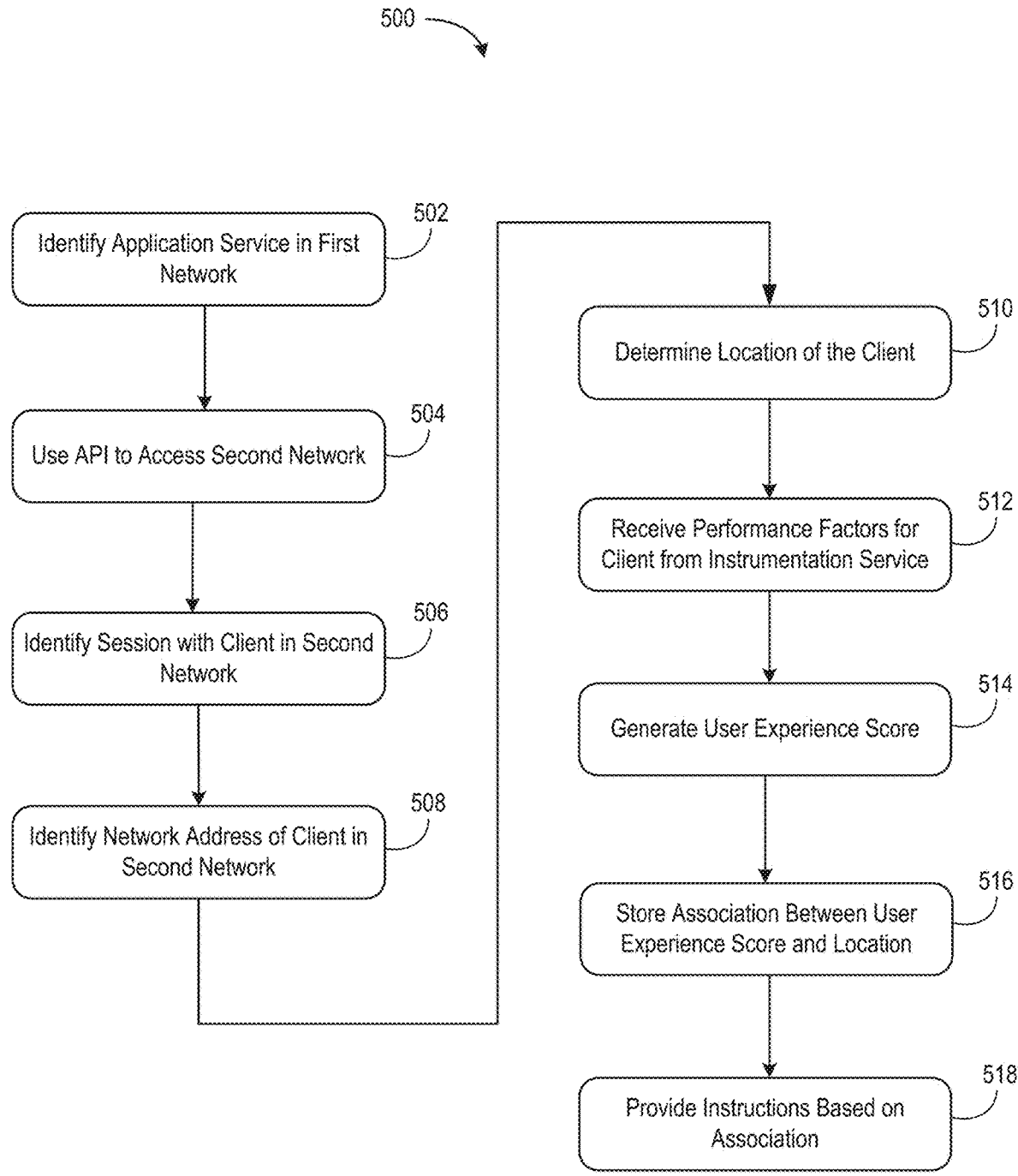
FIG. 5A is a flow diagram of a method for associating a user experience score with a location of a client in accordance with an illustrative embodiment.

Referring now to FIG. 5A, depicted is a flow diagram of an embodiment of a method 500 for associating a user experience score with a location of a client. The operations and functionalities of the method 500 may be performed by the components described in FIG. 1 and FIG. 2, and/or the system 300 detailed above. In brief overview, a computing device may identify a session between a client and an application service established via a first network (502). The computing device may use an application programming interface (API) to access a second network (504). The computing device may identify the session with the client via the second network (506). The computing device may receive a network address of the client associated via the second network (508). The computing device may determine a location of the client (510). The computing device may receive a plurality of performance factors for the client from an instrumentation service (512). The computing device may generate a user experience score for the client (514). The computing device may store an association between the user experience score and the location (516). The computing device may provide an instruction based on the association (518).

A computing device may identify a session between a client and an application service established via a first network (502). The computing device may identify the application session (e.g., session 322) between the client (e.g., client 165) and the application service (e.g., application service 302) established via the first network (e.g., network 170A). In some embodiments, the first network is a public network for communications. The public network may include a public network address.

The computing device may use the API (e.g., interface 326) to access the second network (e.g., network 170B) (504). In some embodiments, the second network is a private network. The private network may include a private network address. The computing device can use the API to access the application service. The API can be a computing protocol that defines calls and requests that the computing device can make to the application service relating to the sessions. The API can be configured on the application service for the session detector to identify historical data about the session, identify troubleshooting for client or session issues, or extract any other information about the session. The API can provide a mechanism for the computing device to receive information about the sessions established by the application service. The computing device may identify sessions during a particular time, a particular network, or those for a particular client, among others. In some embodiments, the computing device can retrieve the API from a database (e.g., database 320).

The computing device may identify the session with the client via the second network (506). In some embodiments, the computing device can identify the session on the first network by using the API on the application service to monitor or identify the session. With provision of the session by the application service, the computing device may use the API to identify and process the session. The computing device can detect or identify the session between the client and the application service over the first network. In some embodiments, the computing device can access the application service via the second network to identify the session that is maintained on the first network and between the client and the application service. The computing device can query the application service to receive information relating to sessions established by the application service. In some embodiments, the session detector may identify one or more sessions previously established between the client and the application service. The sessions between the client and the application identified by the computing device may include a currently active session or previous sessions. The active session can a presently existing session in which the client is actively using the session to access the application service. The previous sessions can correspond to sessions from prior time periods during which the client and application service establish a session but are not actively exchanging data. The computing device may store information relating to the identified session in the database.

The computing device may receive a network address of the client (e.g., client network address 328) associated with the second network (508). Responsive to identifying the session, the computing device may receive, via the application service, the client network address of the client associated with the network. Upon identification of the session, the computing device can extract, identify, obtain, or receive the client network address of the client accessing the application service over the first network. In some embodiments, the computing device can identify the network address of another node (e.g., a gateway) in the first network during the session as the client accesses the application service. By accessing the application service, the computing device may identify the session in the first network 170A from the second network to which the computing device is connected to.

The computing device may determine a location of the client (e.g., client location 332) (510). The computing device may determine a location of the client accessing the application service via the network based at least on the client network address. In some embodiments, the computing device may detect a change in the client network address of the client within the network. The computing device may detect the change via the application service. In some embodiments, the computing device may identify a second client location of the client from a prior session with the application service. The computing device may identify the second client location if the computing device fails to identify the client location from at least one of the session or the client network address. In some embodiments, the computing device may identify a second location (e.g., node location 334) as a proxy of the location of the client. The computing device may identify the second location if the computing device fails to identify the client location from at least one of the session or the client network address. In some embodiments, the computing device may determine a location of the client accessing the application service via the network based at least on the network address associated with the first network (e.g., network address 330A). The computing device may also determine the location of the clients based on the network address associated with the second network (e.g., network address 330B).

The computing device may receive a plurality of performance factors (e.g., performance factors 336) for the client from the instrumentation service (e.g., instrumentation service 306) (512). The computing device may receive, from an instrumentation service, a plurality of performance factors for the client. The computing device can associate each of the plurality of performance factors with access to the application service by the client. The computing device can associate each of the plurality of performance factors with a particular session between the client and the application service over the network. The computing device can store the plurality of performance metrics in the database.

The computing device may generate a user experience score (e.g., user experience score 338) for the client (514). The computing device may retrieve, identify, or otherwise receive performance factors for the client from the instrumentation service or the database. Upon receipt of the performance metrics, the computing device may analyze the performance factors to determine a client experience while it accesses the resources hosted on the application service. The device may calculate, generate, or otherwise determine a user experience score for the client based at least on the plurality of performance factors. The user experience score can indicate network performance or user satisfaction relating to the use of products, services, or applications provided by the application service during the session. The computing device can calculate user experience score for the entire session or for each time segment of the session, such as during logon, use, and termination. In some embodiments, the computing device may calculate the user experience score based on the performance factors, relative weights of the performance factors, relative weights of the sessions, or a correction factor.

In some embodiments, the computing device can apply a corrective factor to the calculated user experience score at the client level by considering the performance factors from a plurality of clients for a particular session. A high user experience score can indicate a long logon duration, short round trip time values between the client and the application service, or infrequent connection reconnects and failures between the client and the application service. In contrast, a low user experience score can indicate a short logon duration, long round trip time values between the client and the application service, or frequent connection reconnects and failures between the client and the application service.

In some embodiments, the computing device may calibrate the performance factors to predetermined thresholds by adjusting the performance factors based on offset values such as minimum round trip times or maximum logon duration. The computing device can also weigh the performance factors by considering a performance factor such as session reconnects to have a greater effect on the user experience score than a performance factor such as packet round trip times. Similarly, the computing device can weigh performance factors by considering high priority sessions, such as those maintaining a system critical application service or live streaming, to have a greater effect on the user experience score than lower priority sessions, such as those relating to file sharing. In some embodiments, the computing device may detect a change to the user experience score for the client based at least on a second plurality of performance factors identified subsequent to the plurality of performance factors. The computing device can store the calculated user experience score in the database.

The computing device may store an association (e.g., association 340) between the user experience score and the location (516). The computing device may store an association (e.g., in the database 320) between the user experience score for the client with the location. In some embodiments, the computing device may identify a second association between the client and one or more second clients accessing the application service based at least on a second location for each of the one or more second clients. The computing device may update, responsive to detecting a change in location, the location and the association between the location and the user experience score for the client. The computing device may also update the association between the location and the user experience score in accordance with the change to the user experience score.

The computing device may provide an instruction (e.g., mitigation action 344) based on the association (518). In some embodiments, the computing device may determine a cause of the user experience score determined to be less than a threshold score based at least on the location of the client. In some embodiments, the computing device may determine the instruction to provide for a mitigation action to be performed to the session between the client and the application service. The computing device may provide the instruction if the user experience score is less than a threshold score. The mitigation action may include at least one of a redirection of the client to a second application service, a reconfiguration of the application service, or a rerouting of the client through a third network. In some embodiments, the computing device may provide a graphical user interface (e.g., interface 342) for presentation of an indicator identifying the association between the user experience score for the client with the location. The graphical user interface provided by the computing device may be presented on a display communicatively coupled with the computing device. The computing device can retrieve the associations from the database for display in the graphical user interface during or after the session.

Using the associations generated by the computing device and stored in the database, the computing device can display approximations in the graphical user interface of how client locations or network locations may affect the user experience score. The graphical user interface can receive a selection of a client location, and display information relating to user experience score, client network address, performance metrics, or any other network session information of clients of the selected client location. The computing device can display the information in a table having a user experience score, a user name, a total sessions, and session types. In some embodiments, the computing device can also generate and provide a heat-map of geographical locations along with associated user experience scores at various client locations or network locations. The heat-map can be known as a geo-map and can be color coded based on user experience scores and location. Accordingly, the computing device can visualize network performance of sessions by client location and network location. Therefore, the computing device can detect or display degradations to client experience at particular locations. If the computing device maps user experiences scores by network performance, then degradations to the client experience can be mapped on a location basis and every location can have a characteristic performance metric.

Figure 5B:
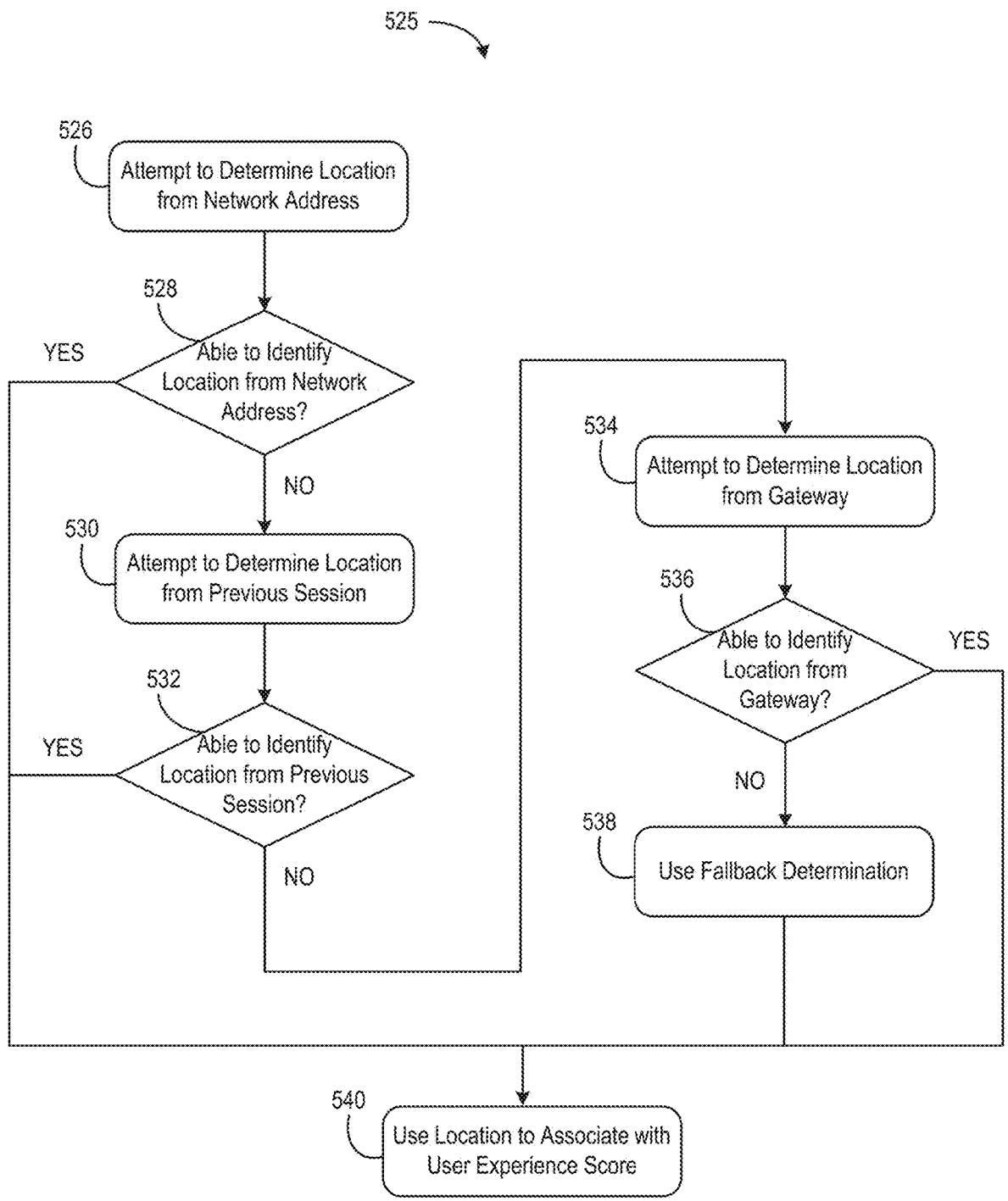
FIG. 5B is a flow diagram of a method for detecting a location of a client in accordance with an illustrative embodiment.

Referring now to FIG. 5B, depicted is a flow diagram of an embodiment of a method 525 for detecting a location of a client. The operations and functionalities of the method 525 may be performed by the components described in FIG. 1 and FIG. 2, and/or the system 300 detailed above. The method 525 may correspond to action (510) as discussed herein in conjunction with method 500. In brief overview, the computing device may attempt to determine a location of the client from a network address of the client (526). The computing device may determine whether the location of the client can be determined from the network address (528). The computing device may determine the location of the client based on a previous session of the client (530). The computing device may attempt to determine whether the location of the client can be determined from previous sessions (532). The computing device may attempt to determine the location of the client based on a location of a gateway (534). The computing device may determine whether the location of the client can be determined from the location of the gateway (536). The computing device may determine the location of the client based on a fallback determination (538). The computing device may associate the determined location with the user experience score (540).

The computing device may attempt to determine a location (e.g., client location 332) of the client (e.g., client 165) from a network address (e.g., client network address 328) of the client (526). The computing device can determine the location of the client during a particular session (e.g., session 322). In some embodiments, the computing device can determine whether the client location able to be identified from the client network address. The computing device can use a geolocation database to map or correspond network addresses (e.g., using public IP addresses) to physical locations. The computing device can use the geolocation database to map the network address of the client to a country, city, zip code, or global positioning coordinates. For instance, the network address of the client may indicate a particular physical address, city, or network region of the client. The computing device can store the location of the client in the database (e.g., database 320). The computing device can also include an extract, transform, load (ETL) layer to map the client network address to a file format for storing information about the client location in the database.

The computing device may determine whether the location of the client can be determined from the network address (528). The computing device can use the geolocation database to map the network address of the client to a country, city, zip code, or global positioning coordinates. The geolocation database may also lack a location value for at least one of the address, city, or network region for the given client network address (e.g., a null value). For example, the computing device may be unable to access the network that maintains the session to determine the client location, or a mapping of the client network address to a client location is unsupported in a particular region of the client.

If the computing device is unable to determine the client location from the client network address, the computing device may attempt to determine the location of the client based on a previous session of the client (530). The computing device can analyze previous client locations, such as country or city, associated with a particular client. In some embodiments, the computing device may identify, responsive to failure to identify the client location from at least one of the session or the client network address, a client location of the client from a prior session with the application service. The computing device can retrieve a history of previous client locations from the database. The computing device can select or identify a particular time period from which to identify a previously established session. The computing device can then retrieve a history of previous client locations from the previously established session. The history of previous client locations can indicate a known client location of the client during each session previously established between the client and the application service. The location estimator can then determine the client location based on a last known client location of the client. In addition, if the client launches establishes multiple sessions and location data is unavailable for some of the sessions, then the computing device can use an available client location for any of the sessions as the best-effort estimate for the unavailable client locations.

The computing device may determine whether the location of the client can be determined from the previous sessions (532). The computing device can use the geolocation database to map the network address of the client during previous sessions to a country, city, zip code, or global positioning coordinates. The computing device can also retrieve client locations of the client during previous sessions from the database. However, the geolocation database may also indicate that the client network address corresponds to a null location value for at least one of the address, city, or network region. The computing device may also be unable to use any previous sessions if the client is new to the application service and thus not associated with any previous sessions, or the client does not allow (such as due to regulatory or privacy reasons) its session information to be tracked. Similarly, the computing device may also be unable to access the database to retrieve previous sessions or the database with previous session information may be unavailable.

If the computing device is unable to determine the client location from the previous sessions, the computing device may attempt to determine the location of the client based on a location (e.g., node location 334A) of a gateway (e.g., gateway 324A) (534). The computing device can also use the location attributes (e.g., node location 334B) of networking components (e.g., a gateway 324B or a proxy) of a private network (e.g., network 170B) as the client location. Since a session between the client and the application service may also be maintained on the network having the network location, the computing device can use the network location as the client location. By determining the network location of the network, the computing device can then use the network location corresponding to the network for the client to estimate the client location or use the determined network location as the client location. The computing device can identify a gateway or proxy within the network.

In some embodiments, the computing device can determine the network location based on a network address (e.g., network address 330) of the gateway or the proxy. The computing device can retrieve the network address. The computing device can retrieve the network address from the database, and the network address can be identified by the computing device. The computing device can determine the network location of the gateway based on the network address associated with the network. The network address can be associated with the session. The computing device can look up the network address in a directory or geolocation database. The geolocation database can indicate where the network (or its gateway or proxy residing in the network) having the particular network address may be physically located. The computing device can map the network address to a country, city, zip code, or global positioning coordinates. In some embodiments, the computing device can retrieve, from a directory, a country, city, or address for the computing device associated with the network address.

The computing device may determine whether the location of the client can be determined from the location of the gateway (536). The computing device can use the geolocation database to map the network address of the gateway to a country, city, zip code, or global positioning coordinates. However, the geolocation database may also lack a location value for at least one of the address, city, or network region for the given network address (e.g., a null value). The computing device may also be unable to determine the location of the gateway if the gateway does not allow (such as due to regulatory or privacy reasons) its session information to be tracked. For example, the computing device may be unable to access the network that maintains the session to determine the gateway location, or a mapping of the network address to a gateway location is unsupported in a particular region associated with the network.

The computing device may determine the location of the client based on a fallback determination (538). The computing device may maintain or identify a fallback determination corresponding the last non-null location value for a particular client. The computing device can retrieve the last non-null location value of the client from the database. The computing device can then estimate the current client location based on the last non-null location of the client. The fallback can also be to a storefront service, which may provide a network address (e.g., public IP) of the client. Based on a network address of the storefront device, the computing device may determine the location of the storefront device. The computing device can use the geolocation database to map the network address of the storefront device to a country, city, zip code, or global positioning coordinates. The computing device can then estimate the client location based on the location of the storefront device.

With the determination of the client location and the user experience score, the computing device may associate the determined location with the user experience score (540). The computing device may determine, obtain, or generate an association between user experience score and the client location. In some embodiments, the computing device may store and maintain the association between the user experience score and the client location onto the database. The computing device may generate each association using statistical analysis to determine where there is a relationship between locations and user experience scores 338. The computing device may determine the extent to which the user experience score and client location have a predictive relationship that can be used by the computing device to optimize network services. The computing device may store each association in a data structure in the database. In some embodiments, upon determination of the client location, the method 600 may proceed to action (512) as discussed herein in conjunction with method 500.

Figure 5C:
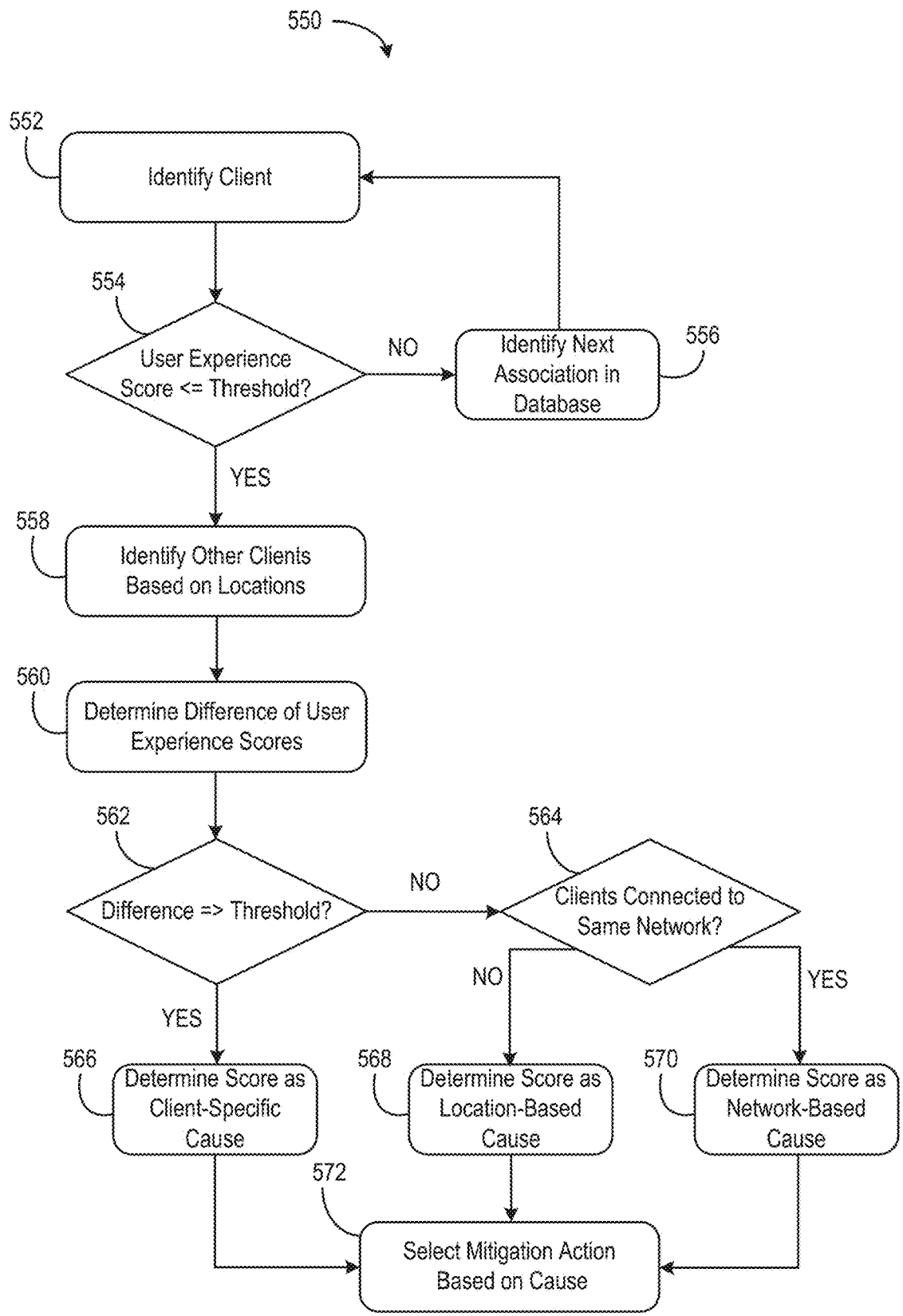
FIG. 5C is a flow diagram of a method for providing instructions for performing at least one action based on the associations between a location of a client and the user experience scores.

Referring now to FIG. 5C, depicted is a flow diagram of an embodiment of a method 550 for providing instructions for performing at least one action based on the associations between a location of a client and the user experience scores. The operations and functionalities of the method 550 may be performed by the components described in FIG. 1 and FIG. 2, and/or the system 300 detailed above. The method 550 may correspond to action (540) as discussed herein in conjunction with method 500. In brief overview, the computing device may identify a client (552). The computing device may determine whether the user experience of the client satisfies a predetermined threshold (554). If the user experience score satisfies the threshold, the computing device may identify another association (556). If the user experience score does not satisfy the threshold, the computing device may identify other clients based on locations (558). The computing device may determine differences of user experience scores (560). The computing device may determine whether the differences satisfy a predetermined threshold (562). If the difference does not satisfy the threshold, the computing device may determine whether the clients are connected to the same network (564). Otherwise, if the different does satisfy the threshold, the computing device may determine the user experience score as a client-specific cause (566). If the clients are determined not to be connected to the same network, the computing device may determine the user experience score as a location-based cause (568). If the clients are determined to be connected to the same network, the computing device may determine the user experience score as a network-based cause (570). The computing device may select a mitigation action based on the determined cause (572).

The computing device may identify a client (552). The computing device may present a graphical user interface for displaying client experience at different locations. The graphical user interface can include a selectable location list that corresponds to various locations where sessions are maintained, such as client locations and network locations. The computing device may receive a selection of a client via the graphical user interface. The computing device can retrieve information about the client from the database. The computing device can present the retrieved information about the client such as time, client location, or session type.

The computing device may receive a selection of a client location, time, session type, or any other client related parameters via the graphical user interface. The computing device can identify user experience scores associated with the selected client parameters. For example, the computing device can identify user experience scores for the client when the client was at a particular location at a certain time and during a certain session. The computing device may present associations between user experience scores and the selected client locations (or other selected parameters) in the graphical user interface. The computing device can also retrieve the associations from the database.

The computing device may determine whether the user experience of the client satisfies a predetermined threshold (554). The computing device may retrieve the predetermined threshold from the database. The predetermined threshold may indicate an acceptable level of user experience. The predetermined threshold can correspond to a user experience score at the acceptable network level. The computing device may present user experience scores that satisfy the predetermined threshold in the graphical user interface in green or other indicators. The computing device may present user experience scores that fail to satisfy the predetermined threshold in the graphical user interface, such as the heatmap, in red or other alert indicators. Similarly, the computing device can identify or store client locations or network locations where the client has user experiences scores below the predetermined threshold.

The computing device may identify another association (556). The computing device may monitor for additional associations until identifying an association for a user experience score that fails to satisfy the predetermined threshold. The computing device can also query the database for the additional associations. The computing device may identify associations between the user experience score and another client location or network location. The computing device can also present a request to the graphical user interface for a selection of a different association for the client, such during a different time, a different session, or at a different client location.

The computing device may identify other clients based on locations (558). The computing device can identify user experience scores at particular client locations or network locations for each client. The computing device may identify other clients if the user experience score for a client fails to satisfy the predetermined threshold. For example, if the computing device determines that the user experience score associated with the client fails to satisfy the predetermined threshold, the computing device can query, detect, or identity clients that have client locations that are within a predetermined distance of the client location of the client. The computing device can identify one or more other clients associated with client locations within a predetermined distance around the client (e.g., 10 to 160 km) or connected to the same network or proxy within the network. Similarly, the computing device can query, detect, or identity clients using the same network or networks with network locations that are within a predetermined distance of the client location. The computing device can then identify one or more other networks associated with network locations within a predetermined distance around the network location (e.g., 10 to 160 km). The computing device can also identify clients associated with similar session types or network activities during similar times as the client. The computing device can identify the similar clients based on the selected client parameters.

The computing device may determine differences of user experience scores (560). By identifying the other clients, the computing device can query or identify the user experience scores of those clients. The computing device compare the user experience scores of different clients to analyze or identify the client experience relative to the user experience of other clients at similar client locations or network locations. The computing device can also determine average user experience scores for a particular client location or network location. For example, the computing device can compare the user experience score of the selected client to the average user experience score of the other clients. Based on the differences, the computing device can determine the cause of the user experience scores. The cause may include location-based causes, client-specific causes, or network-based cause, among others.

The computing device may determine whether the differences satisfy a predetermined threshold (562). The computing device can compare the user experience scores of the other clients to determine whether the user experience scores for the selected client differs by more than a predetermined threshold from the other clients. The computing device can identify client locations or network locations where clients have user experience scores greater or below the predetermined threshold. The predetermined threshold can indicate an acceptable user experience difference between the client and other clients for a particular client location, network location, time, or session type. For example, the predetermined threshold for an important network location or session type can be low so even minute deviations in the user experience score of a particular client will fail to satisfy the predetermined threshold. Conversely, the predetermined threshold may be high for a session type that is not important, so deviations in user experience score may be deemed acceptable. The predetermined threshold for the differences may be set the computing device or received via the graphical user interface for each client, client location, network location, session type, or time.

The computing device may determine whether the clients are connected to the same network (564). The computing device can determine whether the comparisons between the client and other clients were for sessions maintained by the same network. For example, the computing device can determine that the other clients connected via the same network address or the same network location. The computing device can also detect if the other clients connected via the same gateway. When connected via the same gateway or network, the computing device may determine that the clients are connected to the same network. Conversely, when connected via different networks, the computing device may determine that the clients are not connected to the same network.

The computing device may determine the user experience score as a client-specific cause (566). The computing device may determine the user experience score is caused by the client if the user experience score of the client is different from the user experience score of the other clients. For example, when the difference between the user experience score of the client and other clients satisfies the predetermined threshold, the computing device can determine that the client's anomalous user experience score is caused by the client. A client-specific cause may be an identification that the particular client has a relatively lower user experience score relative to other clients in similar locations or similar network. For example, the computing device can determine that the other clients at nearby client location have different user experience scores. Therefore, the client has an anomalous user experience score and the cause is client-specific. The computing device can also determine the case to be client-specific by identifying the that user experience scores of the client are associated with certain performance factors specific to a client, such as client initiated connections reconnects or long packet processing times. Similarly, the computing device can determine the cause to be client-specific by identifying application services or their sessions that are associated with a particular client experience. For example, the computing device can identify that the client is associated with client-specific sessions or application services, such as those relating to complex data processing or incompatible operating systems.

The computing device may determine the user experience score as a location-based cause (568). Based on the differences between the user experience score of the client and the user experience scores of the other clients, the computing device can determine that the client location is the cause of the user experience score. The computing device may determine that the cause is location-specific if the client is not connected to the same network as other clients and that the user experience score of the client is similar to the user experience scores of the other clients at similar client locations. Therefore, if the clients are not connected to the same network but they have similar user experience scores, then the location of the clients are causing the user experience scores. The computing device can also retrieve average user experience scores for a client location to determine the location-specific cause. For example, if a client location is associated with an average user experience score indicating unsatisfactory performance, then a session established at that client location and having the average user experience score can indicate a location-based cause.

The computing device may determine the user experience score as a network-based cause (570). Based on the differences between the user experience score of the client and the user experience scores of the other clients, the computing device can determine that the network location is the cause of the user experience score. The computing device may determine that the cause is network-specific if the client is connected to the same network as other clients and that the user experience score of the client is similar to the user experience scores of the other clients. Therefore, if the clients are connected to the same network and they have similar user experience scores, then the network (or gateway) the clients are using is causing the user experience scores. For example, if a network (or its network location) is associated with an average user experience score indicating unsatisfactory performance, then a session established via that network and having the average user experience score can indicate a network-based cause.

The computing device may select a mitigation action based on the determined cause (572). If the determined cause is client-specific, the mitigation action may include a reconfiguration of the session or routing the client to a different application service. For example, the computing device may request the application service to have the network issue a new client network address to the client or route the session through a different network. Similarly, the computing device can request the application service to reestablish the session and/or refresh the associated client network address and/or the network address. For example, the computing device can request the application service to establish the session with a different client network address that is nonetheless associated with the client (such as a secondary or backup server of the client). The computing device can also request the application service to establish the session using a different security protocol or streaming protocol, or to update the software application provided to the client. Additionally, the computing device can notify the client to request corrective action or other adjustments relating to the client.

If the determined cause is location-specific, the mitigation action may include routing the client based on location. For example, if the network is associated with the network location that is geographically distant from the client or application service, then the computing device may request the application service to route the session through a network that is closer to the client or application service.

If the determined cause is network-specific, the mitigation action may include rerouting of the client through another network. For example, if the network is associated with network address that is blocked or throttled for the client, then the computing device may request the application service to have the network issue a new network address or route the session through a different network such as network. The mitigation action may also include a reconfiguration of the application service. The computing device can request the application service to assign a higher service priority to a particular client to provide improved networking services. Additionally, the computing device can notify a network administrator to request corrective action or other adjustments relating to the network.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of associating user experience scores with physical locations of clients, comprising:
   identifying, by a device, a session between a client and an application service established via a first network;
   obtaining, by the device via the application service, a network address of the client associated with a second network, responsive to identifying the session;
   determining, by the device, a physical location of the client accessing the application service via the first network based at least on the network address associated with the second network;
   receiving, by the device from an instrumentation service, a plurality of performance factors for the client, each of the plurality of performance factors associated with access to the application service by the client;
   generating, by the device, a user experience score for the client based at least on the plurality of performance factors;
   providing, by the device, an instruction based at least on an association between the user experience score for the client with the physical location;
   detecting, by the device via the application service, a change in the network address of the client within the second network; and
   updating, by the device responsive to detecting the change, the physical location and the association between the physical location and the user experience score for the client.

2. The method of claim 1, further comprising determining, by the device, a cause of the user experience score, responsive to the user experience score being less than a threshold score based at least on the physical location of the client.

3. The method of claim 1, wherein providing the instruction further comprises determining, responsive to the user experience score being less than a threshold score, the instruction to provide for a mitigation action to be performed to the session between the client and the application service, the mitigation action including at least one of a redirection of the client to a second application service, a reconfiguration of the application service, or a rerouting of the client through a third network.

4. The method of claim 1, further comprising identifying, by the device, a second association between the client and one or more second clients accessing the application service based at least on a second physical location for each of the one or more second clients.

5. The method of claim 1, wherein providing the instruction further comprises providing a graphical user interface for presentation of an indicator identifying the association between the user experience score for the client with the physical location.

6. The method of claim 1, further comprising:
   detecting, by the device, a change to the user experience score for the client based at least on a second plurality of performance factors identified subsequent to the plurality of performance factors; and
   updating, by the device, the association between the physical location and the user experience score in accordance with the change to the user experience score.

7. The method of claim 1, wherein determining the physical location further comprises identifying, responsive to failure to identify the physical location from at least one of the session or the network address, a second physical location of the client from a prior session with the application service.

8. The method of claim 1, wherein determining the physical location further comprises identifying, responsive to failure to identify the physical location from at least one of the session or the network address, a second physical location of a proxy as the location of the client.

9. The method of claim 1, wherein the first network is a private network and the second network is a public network for communications, and wherein the network address is a public network address in the public network.

10. A system for associating user experience scores with physical locations of clients, comprising:
    a device having one or more processors coupled with memory, configured to:
       identify a session between a client and an application service established via a first network;
       obtain, via the application service, a network address of the client associated with a second network, responsive to identifying the session;
       determine a physical location of the client accessing the application service via the first network based at least on the network address associated with the second network;
       receive, from an instrumentation service, a plurality of performance factors for the client, each of the plurality of performance factors associated with access to the application service by the client;
       generate a user experience score for the client based at least on the plurality of performance factors;
       provide an instruction based at least on an association between the user experience score for the client with the physical location;
       detect a change to the user experience score for the client based at least on a second plurality of performance factors identified subsequent to the plurality of performance factors; and
       update the association between the physical location and the user experience score in accordance with the change to the user experience score.

11. The system of claim 10, wherein the one or more processors are further configured to determine a cause of the user experience score being less than a threshold score based at least on the physical location of the client.

12. The system of claim 10, wherein generating the instruction further comprises determining, responsive to the user experience score being less than a threshold score, the instruction to provide for a mitigation action to be performed to the session between the client and the application service, the mitigation action including at least one of a redirection of the client to a second application service, a reconfiguration of the application service, or a rerouting of the client through a third network.

13. The system of claim 10, wherein generating the instruction further comprises providing a graphical user interface for presentation of an indicator identifying the association between the user experience score for the client with the physical location.

14. The system of claim 10, wherein the one or more processors are further configured to:
- detect, via the application service, a change in the network address of the client within the second network; and
- update, responsive to detecting the change, the physical location and the association between the physical location and the user experience score for the client.

15. The system of claim 10, wherein determining the physical location further comprises identifying, responsive to failure to identify the physical location from at least one of the session or the network address, a second physical location of the client from a prior session with the application service.

16. A non-transitory computer readable medium storing program instructions for causing one or more processors to:
- identify a session between a client and an application service established via a first network;
- obtain, via the application service, a network address of the client associated with a second network, responsive to identifying the session;
- determine a physical location of the client accessing the application service via the first network based at least on the network address associated with the second network;
- receive, from an instrumentation service, a plurality of performance factors for the client, each of the plurality of performance factors associated with access to the application service by the client;
- generate a user experience score for the client based at least on the plurality of performance factors;
- provide an instruction based at least on an association between the user experience score for the client with the physical location;
- detect a change to the user experience score for the client based at least on a second plurality of performance factors identified subsequent to the plurality of performance factors; and
- update the association between the physical location and the user experience score in accordance with the change to the user experience score.

17. The non-transitory computer readable medium of claim 16, wherein the program instructions further cause the one or more processors to identify, responsive to failure to identify the physical location from at least one of the session or the network address, a second physical location of a proxy as the physical location of the client.

18. The non-transitory computer readable medium of claim 16, wherein the program instructions further cause the one or more processors to provide, responsive to the user experience score being less than a threshold score, the instruction to provide for a mitigation action to be performed to the session between the client and the application service, the mitigation action including at least one of a redirection of the client to a second application service, a reconfiguration of the application service, or a rerouting of the client through a third network.

* * * * *